(12) United States Patent
Zheng et al.

(10) Patent No.: US 8,822,894 B2
(45) Date of Patent: Sep. 2, 2014

(54) LIGHT-FIELD PIXEL FOR DETECTING A WAVEFRONT BASED ON A FIRST INTENSITY NORMALIZED BY A SECOND INTENSITY

(75) Inventors: Guoan Zheng, Pasadena, CA (US); Changhuei Yang, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 283 days.

(21) Appl. No.: 13/344,523

(22) Filed: Jan. 5, 2012

(65) Prior Publication Data

US 2012/0211644 A1  Aug. 23, 2012

Related U.S. Application Data

(60) Provisional application No. 61/430,690, filed on Jan. 7, 2011.

(51) Int. Cl.
*G01J 1/20* (2006.01)
*G01J 9/00* (2006.01)

(52) U.S. Cl.
CPC .......................................... *G01J 9/00* (2013.01)
USPC ..................................... 250/201.9; 250/208.1

(58) Field of Classification Search
USPC ............ 250/201.9, 208.1, 216, 239; 356/121, 356/512–521; 359/846–849
See application file for complete search history.

(56) References Cited

U.S. PATENT DOCUMENTS

| | | |
|---|---|---|
| 4,438,330 A | 3/1984 | Hardy |
| 4,692,027 A | 9/1987 | MacGovern et al. |
| 4,737,621 A | 4/1988 | Gonsiorowski et al. |
| 4,980,716 A | 12/1990 | Suzuki et al. |
| 5,124,927 A | 6/1992 | Hopewell et al. |
| 5,196,350 A | 3/1993 | Backman et al. |
| 5,233,174 A | 8/1993 | Zmek |
| 5,300,766 A | 4/1994 | Granger et al. |
| 5,426,505 A | 6/1995 | Geiser et al. |
| 5,587,832 A | 12/1996 | Krause |
| 5,936,764 A | 8/1999 | Kobayashi |

(Continued)

FOREIGN PATENT DOCUMENTS

| | | |
|---|---|---|
| WO | WO 2004/038484 | 5/2004 |
| WO | WO 2010/090849 | 8/2010 |
| WO | WO 2010/141702 | 12/2010 |

OTHER PUBLICATIONS

United States Patent and Trademark Office (USPTO) Office Action in U.S. Appl. No. 11/743,581 dated on May 22, 2009.

(Continued)

*Primary Examiner* — Que T Le
(74) *Attorney, Agent, or Firm* — Sheila Martinez-Lemke; Weaver Austin Villeneuve & Sampson LLP

(57) ABSTRACT

A light-field pixel for detecting a wavefront, the light-field pixel comprises an aperture layer, a light detector layer, and a processor. The aperture layer has a non-conventional aperture and a non-conventional aperture. The non-conventional aperture has a higher gradient of transmission at normal incidence than the conventional aperture. The light detector is configured to measure a first intensity of light through the non-conventional aperture and a second intensity of light through the conventional aperture. The processor is configured to detect the wavefront based on the first intensity normalized by the second intensity.

26 Claims, 12 Drawing Sheets

(56) References Cited

U.S. PATENT DOCUMENTS

| | | | |
|---|---|---|---|
| 6,130,419 A | 10/2000 | Neal | |
| 6,133,986 A | 10/2000 | Johnson | |
| 6,248,988 B1 | 6/2001 | Krantz | |
| 6,636,300 B2 | 10/2003 | Doemens et al. | |
| 6,753,131 B1 | 6/2004 | Rogers et al. | |
| 6,858,436 B2 | 2/2005 | Zenhausern et al. | |
| 6,987,255 B2 | 1/2006 | Smith | |
| 7,113,268 B2 | 9/2006 | Gerwe et al. | |
| 7,209,287 B2 | 4/2007 | Lauer | |
| 7,250,598 B2 | 7/2007 | Hollingsworth et al. | |
| 7,399,445 B2 | 7/2008 | Kuroda et al. | |
| 7,738,695 B2 | 6/2010 | Shorte et al. | |
| 7,768,654 B2 | 8/2010 | Cui et al. | |
| 7,864,333 B1 | 1/2011 | Olczak et al. | |
| 7,982,883 B2 | 7/2011 | Cui et al. | |
| 8,039,776 B2 | 10/2011 | Cui et al. | |
| 8,120,765 B2* | 2/2012 | Huang et al. | 356/217 |
| 8,189,204 B2 | 5/2012 | Cui et al. | |
| 8,325,349 B2 | 12/2012 | Cui et al. | |
| 8,411,282 B2 | 4/2013 | Cui et al. | |
| 8,416,400 B2 | 4/2013 | Cui et al. | |
| 8,525,091 B2 | 9/2013 | Cui et al. | |
| 2004/0156610 A1 | 8/2004 | Charlton et al. | |
| 2004/0190116 A1 | 9/2004 | Lezec et al. | |
| 2004/0224380 A1 | 11/2004 | Chou et al. | |
| 2005/0007603 A1 | 1/2005 | Arieli et al. | |
| 2005/0088735 A1 | 4/2005 | Olszak | |
| 2005/0161594 A1 | 7/2005 | Hollingsworth et al. | |
| 2005/0271548 A1 | 12/2005 | Yang et al. | |
| 2006/0175528 A1 | 8/2006 | Greenaway et al. | |
| 2007/0069999 A1 | 3/2007 | Gu et al. | |
| 2007/0172745 A1 | 7/2007 | Smith | |
| 2007/0207061 A1 | 9/2007 | Yang et al. | |
| 2007/0258096 A1 | 11/2007 | Cui et al. | |
| 2007/0277192 A1 | 11/2007 | Hendriks et al. | |
| 2008/0212430 A1 | 9/2008 | Bakker et al. | |
| 2009/0079992 A1 | 3/2009 | Doerband | |
| 2009/0225319 A1 | 9/2009 | Lee et al. | |
| 2009/0225411 A1 | 9/2009 | Cui et al. | |
| 2009/0276188 A1 | 11/2009 | Cui et al. | |
| 2010/0195873 A1 | 8/2010 | Cui et al. | |
| 2010/0309457 A1 | 12/2010 | Cui et al. | |
| 2011/0063623 A1 | 3/2011 | Cui et al. | |
| 2011/0075254 A1 | 3/2011 | Cui et al. | |
| 2011/0085219 A1 | 4/2011 | Yang et al. | |
| 2011/0170105 A1 | 7/2011 | Cui et al. | |
| 2011/0181884 A1 | 7/2011 | Cui et al. | |
| 2012/0026509 A1 | 2/2012 | Cui et al. | |
| 2012/0061554 A1 | 3/2012 | Cui et al. | |
| 2012/0250027 A1 | 10/2012 | Zheng et al. | |

OTHER PUBLICATIONS

United States Patent and Trademark Office (USPTO) Final Office Action in U.S. Appl. No. 11/743,581 dated on Dec. 3, 2009.
United States Patent and Trademark Office (USPTO) Notice of Allowance in U.S. Appl. No. 11/743,581 dated on Mar. 26, 2010.
United States Patent and Trademark Office (USPTO) Notice of Allowance in U.S. Appl. No. 12/823,201 dated on Mar. 1, 2011.
United States Patent and Trademark Office (USPTO) Notice of Allowance in U.S. Appl. No. 12/823,201 dated on Mar. 11, 2011.
United States Patent and Trademark Office (USPTO) Office Action in U.S. Appl. No. 13/157,245 dated on Dec. 6, 2011.
United States Patent and Trademark Office (USPTO) Notice of Allowance in U.S. Appl. No. 13/157,245 dated on Aug. 23, 2012.
U.S. Allowed Claims for U.S. Appl. No. 13/157,245 dated on Dec. 3, 2012.
United States Patent and Trademark Office (USPTO) Notice of Allowance in U.S. Appl. No. 13/157,245 dated on Dec. 3, 2012.
United States Patent and Trademark Office (USPTO) Notice of Allowance in U.S. Appl. No. 12/792,059 dated on Dec. 14, 2011.
United States Patent and Trademark Office (USPTO) Office Action in U.S. Appl. No. 12/638,518 dated on Jan. 12, 2012.
United States Patent and Trademark Office (USPTO) Notice of Allowance in U.S. Appl. No. 12/638,518 dated on Feb. 14, 2012.
United States Patent and Trademark Office (USPTO) Notice of Allowance in U.S. Appl. No. 12/638,518 dated on Apr. 23, 2012.
United States Patent and Trademark Office (USPTO) Notice of Allowance in U.S. Appl. No. 12/638,518 dated on Aug. 24, 2012.
United States Patent and Trademark Office (USPTO) Office Action in U.S. Appl. No. 12/435,165 dated on Apr. 12, 2011.
United States Patent and Trademark Office (USPTO) Notice of Allowance in U.S. Appl. No. 12/435,165 dated on Jun. 10, 2011.
United States Patent and Trademark Office (USPTO) Notice to File Corrected Application Papers in U.S. Appl. No. 12/435,165 dated on Jul. 25, 2011.
United States Patent and Trademark Office (USPTO) Office Action in U.S. Appl. No. 13/229,741 dated on Apr. 12, 2012.
United States Patent and Trademark Office (USPTO) U.S. Allowed Claims in U.S. Appl. No. 13/229,741 dated on Dec. 7, 2012.
United States Patent and Trademark Office (USPTO) Notice of Allowance in U.S. Appl. No. 13/229,741 dated on Dec. 7, 2012.
United States Patent and Trademark Office (USPTO) Notice of Allowance in U.S. Appl. No. 13/229,741 dated on Apr. 24, 2013.
United States Patent and Trademark Office (USPTO) Office Action in U.S. Appl. No. 12/690,952 dated on Oct. 5, 2012.
United States Patent and Trademark Office (USPTO) Notice of Allowance in U.S. Appl. No. 12/690,952 dated on Mar. 26, 2013.
United States Patent and Trademark Office (USPTO) Office Action in U.S. Appl. No. 12/690,952 dated on Jun. 17, 2013.
United States Patent and Trademark Office (USPTO) Notice of Allowance in U.S. Appl. No. 12/690,952 dated on Dec. 6, 2013.
United States Patent and Trademark Office (USPTO) Office Action in U.S. Appl. No. 12/792,177 dated on Dec. 23, 2011.
United States Patent and Trademark Office (USPTO) Notice of Allowance in U.S. Appl. No. 12/792,177 dated on Aug. 29, 2012.
United States Patent and Trademark Office (USPTO) U.S. Allowed Claims in U.S. Appl. No. 12/792,177 dated on Dec. 10, 2012.
United States Patent and Trademark Office (USPTO) Notice of Allowance in U.S. Appl. No. 12/792,177 dated on Dec. 10, 2012.
United States Patent and Trademark Office (USPTO) Miscellaneous Action in U.S. Appl. No. 12/792,177 dated on Jan. 11, 2013.
PCT International Search Report and Written Opinion dated Jun. 29, 2010 issued in PCT/US2010/021561.
PCT International Preliminary Report on Patentability and Written Opinion dated Aug. 4, 2011 issued in PCT/US2010/021561.
European Patent Office (EPO) European Supplementary Search Report dated Jun. 11, 2012 issued in EP 10 738 939.7.
PCT International Search Report and Written Opinion dated Dec. 20, 2010 issued in PCT/US2010/037235.
PCT Preliminary Report on Patentability and Written Opinion dated Dec. 15, 2011 issued in PCT/US2010/037235.
Chinese First Office Action dated Nov. 1, 2012 issued in CN 201080024175.6.
"Adaptive optics," Wikipedia, last modified Mar. 17, 2009, five pages.
Beam Steering Using Liquid Crystals, Boulder Nonlinear Systems, downloaded from the Internet at http://www.bnonlinear.com/papers/LCBeamSteering.pdf, May 8, 2001, 4 pages.
"Differential interference contrast microscopy," Wikipedia, last modified Feb. 10, 2009, downloaded from the Internet at http://en.wikipedia.org/wiki/Differential interference contrast microscopy on Mar. 31, 2009, 4 pp.
"Fresnel number," Wikipedia, last modified May 2, 2010.
"Shack-Hartmann," Wikipedia, last visited on Jan. 21, 2009.
"Surface Plasmon," Wikipedia, last modified Apr. 4, 2010.
Types of confocal microscopy, downloaded from the Internet at http://www.mikriskipie.org/2008/01/26/types-of-confocal-microscopy/14/ on Sep. 10, 2010.
"Zone plate," Wikipedia, last modified Apr. 2, 2009.
Abramowitz et al., "Numerical Aperture and Resolution," Olympus Resource Center, downloaded from the Internet at: http://www.olympusmicro.com/primer/anatomy/numaperture.html on Aug. 13, 2012.

(56) References Cited

OTHER PUBLICATIONS

Aigouy, L., et al., "Near-field analysis of surface waves launched at nanoslit apertures," Physical Review Letters, vol. 98, p. 153902 (2007).
Albensi, B. C., et al., "Elements of Scientific Visualization in Basic Neuroscience Research," *BioScience*, 54:1127-1137 (2004).
Allen et al., (1969) "The Zeiss-Nomarski differential interference equipment for transmitted light microscopy," Z. wiss. Mikr 69, 89:30 pp.
Anand, Arun, et al., "Wavefront sensing with random amplitude mask and phase retrieval," Optics Letters, vol. 32, No. 11, pp. 1584-1585 (Jun. 2007).
Arnison, M. R., et al., "Linear Phase Imaging Using Differential Interference Contrast Microscopy," Journal of Microscopy, vol. 214, Part. I, pp. 7-12 (Apr. 2004).
Aroian et al., "Multiple functions of let-23, a *Caenorhabditis elegans* recetor tyrosine kinase gene required for vulval induction," Genetics 128, 251-267 (1991).
Barty, A., et al., "Quantitative optical phase microscopy," Optics Letters, vol. 23, pp. 817-819 (1998).
Beebe, David J., et al., "Physics and Applications of Microfluidics in Biology," Annu. Rev. Biomed., Eng., vol. 4, pp. 261-286 (2002).
Betzig, E., et al.,"Imaging intracellular fluorescent proteins at nanometer resolution," Science, vol. 313, pp. 1642-1645 (2006).
Booth, M. J., et al. , "Adaptive aberration correction in confocal microscope," Proceedings of the National Academy of Sciences of the United States of America, vol. 99, pp. 5788-5792 (Apr. 2002).
Bouwkamp, C. J., "Diffraction theory," Reports on Progress in Physics XVIII, pp. 35-100 (1954).
Carmon, Y., and Ribak, E. N., "Phase retrieval by demodulation of a Hartmann-Shack sensor," Opt. Commun., vol. 215, pp. 285-288 (2003).
Chalut, K. J., et al., "Quantitative phase microscopy with asynchronous digital holography," Optics EXpress, vol. 15, pp. 3047-3052 (2007).
Chen, L., et al. "Role of radiation and surface plasmon polaritons in the optical interactions between a nano-slit and a nano-groove on a metal surface," Optics Express, vol. 14, pp. 12629-12636 (2006).
Cheng, Ya, et al., "Microfluidic laser embedded in glass by three-dimensional femtosecond laser microprocessing," *Optics Letters*, vol. 29, No. 17, pp. 2007-2009 (2004).
Choi, W., et al., "Tomographic Phase Microscopy," *Nature Methods*, 4(9):717-719 (Sep. 2007).
Chovin, Arnaud, et al., "Fabrication, Characterization, and Far-Field Optical Properties of an Ordered Array of Nanoapertures," Nano Letters, vol. 4, No. 10, pp. 1965-1968 (2004).
Chronis, Nikolas, et al., "Total internal reflection-based biochip utilizing a polymer-filled cavity with a micromirror sidewall," *Miniaturisation for Chemistry, Biology & Bioengineering, Lab Chip*, vol. 4, pp. 125-130 (2004).
Cogswell, C., et al., "Confocal Differential Contrast Interference (DIC) Microscopy: Including a Theoretical Analysis of Conventional and Confocal DIC Imaging," Journal of Microcscopy, vol. 165, Pt. 1, pp. 81-101 (Jan. 1992).
Creath, K., "Phase-measurement interferometry techniques," Prog. Opt., vol. 26, p. 44 (1988).
Cui et al., "Wavefront Image Sensor Chip," *Optics Express* 18(16):16685-16701 (2010).
Cui, Xiquan, et al., "Portable optical microscope-on-a-chip," Proc. SPIE, vol. 6095, pp. 609509-1—609509-8 (Jan. 2006).
Cui, Xiquan, et al., "Quantitative differential interference contrast microscopy based on structured-aperture interference," *Applied Physics Letters*, 93:091113-1—091113-3 (2008).
Cui, Xiquan, et al., "Slanted hole array beam profiler (SHArP)—a high-resolution portable beam profiler based on a linear aperture array," *Optics Letters*, 31(21):3161-3163 (2006).
Davidson, M., et al., "Differential interference contrast, 'Comparison of wavelength of DIC microscopy'," Florida State University website, last website modification Jul. 26, 2005, printed Apr. 13, 2009, 12 pages.

De Fornel, F., "Evanescent waves from Newtonian optics and Atomic optics," *Springer Series in Optical Sciences*, 270 pages (2001).
Diel et al., (1996) "Micrometastatic breast cancer cells in bone marrow at primary surgery: Prognostic value in comparison with nodal," *Journal of the National Cancer Institute*, 88:1652-1658.
Drezet, A., et al., "Miniature Plasmonic Wave Plates," Physical Review Letters, vol. 101, pp. 43902-1-043902-4 (Jul. 25, 2008).
Dunn, et al., "Introduction to Confocal Microscopy," available from MicroscopyU at http://www.microscopyu.com/articles/confocal (2007).
Ebbesen, T. W., et al., "Extraordinary optical transmission through sub-wavelength hole arrays," Nature, vol. 391, No. 6668, pp. 667-669 (Feb. 1998).
Erickson et al., (Feb. 2008) "Optofluidics: Emerges from the Laboratory," *Photonics Spectra*, pp. 74-79.
Ferguson et al., "Identification and characterization of 22 genes that affect the vulval cell lineages of the nematode *Caenorhabditis elegans*," Genetics 110, 17-72 (1985).
Fletcher, R., and Reeves, C.M., "Function minimization by conjugate gradients," Comput. J. 7, pp. 149-154 (1964).
Fowles, G. R., Introduction to Modern Optics, *Dover Publications, Second Ed.*, New York, pp. 57-61 (1989).
Fu, Anne Y., et al., "A microfabricated fluorescence-activated cell sorter," Nature Biotechnology, vol. 17, No. 11, pp. 1109-1111 (Nov. 1999).
Garcia De Abajo, F. J. "Light transmission through a single cylindrical hole in a metallic film," Optics Letters, vol. 10, No. 25, pp. 1475-1484 (2002).
Garcia-Sucerquia, J. et al., (2006) "Immersion digital in-line holographic microscopy," *Optics Letters*, 31:1211-1213.
Gay, G., et al., "The optical response of nanostructured surfaces and the composite diffracted evanescent wave model," *Nat Phys*, 2:262-267 (2006).
Gbur, G., et al., "Achieving superresolution in near-field optical data readout systems using surface plasmons," Applied Physics Letters, vol. 87, p. 191109 (2005).
Genet et al., "Light in tiny holes," Nature 445, 39-46 (2007).
Graydon, (2010) "Imaging Phase Sensor on a Chip," *Nature Photonics*, 4:p. 668.
Haglund, M. M., et al., "Enhanced optical imaging of human gliomas and tumor margins," Neurosurgery, vol. 38, pp. 308-317 (1996).
Heng, Xin, et al., "Optofluidic Microscopy," Proceedings of the ICMM 2005 3rd International Conference on Microchannels and Minichannels, pp. 1-6 (2005).
Heng, Xin, et al., "Optofluidic Microscope, a miniature microscope on a chip," 9th International Conference on Miniaturized Systems for Chemistry and Life Sciences (µTAS) (2005).
Heng, Xin, et al., (2006) "Optofluidic Microscopy—a method for implementing a high resolution optical microscope on a chip," *Lab Chip*, 6(10):1274-1276.
Heng, Xin, et al., (2007) "An Optical Tweezer Actuated, Nanoaperture-grid based Optofluidic Microscope Implimentation Method," Optics Express, 15(25):16367-75.
Hoffman, R., and Gross, L., "The modulation contrast microscope," Nature, vol. 254, pp. 586-588 (1975).
Hogenboom, C. A., et al., "Three-dimensional images generated by quadrature interferometry," Optics Letters, vol. 23, pp. 783-785 (1998).
Ikeda, T., et al., "Hilbert phase microscopy for investigating fast dynamics in transparent systems," Optics Letters, vol. 30, pp. 1165-1167 (2005).
Kagalwala, Farhana, and Kanade, Takeo, "Reconstructing Specimens Using DIC Microscope Images," IEEE Transactions on Systems, Man, and Cybernetics-Part B: Cybernetics, vol. 33, No. 5 (Oct. 2003).
Kraus, J. D. And Fleisch, D. A., Electromagnetics with Applications (5th Ed), Chapters 4-16 (1999).
Lalanne, P., and Hugonin, J., "Interaction between optical nano-objects at metallo-dielectric interfaces," Nature Physics, vol. 2, p. 551 (2006).
Laux, E., et al., "Plasmonic photon sorters for spectral and polarimetric imaging," Nature Photonics, vol. 2, pp. 161-164 (2008).

(56) References Cited

OTHER PUBLICATIONS

Lee, Lap Man, et al., (2009) "The Application of On-Chip Optofluidic Microscopy for Imaging *Giardia lamblia* Trophozoites and Cysts," *Biomed Microdevices*, Springer DOI 10.1007/s10544-009-9312-X 11:951-958.

Leen, J., et al. "Improved focused ion beam fabrication of near-field apertures using a silicon nitride membrane," Optics Letters, vol. 33, pp. 2827-2829 (2008).

Lew, Matthew et al., (Oct. 15, 2007) "Interference of a four-hole aperture for on-chip quantitative two-dimensional differential phase imaging," *Optic Letters*, 32(20):2963-2965.

Lezec, H.J., et al. "Beaming Light from a Subwavelength Aperture," Science, vol. 297, No. 5582, pp. 820-822 (2002).

Liang et al., "Objective Measurement of Wave Aberrations of the Human Eye with the Use of a Hartmann-Shack Wave-Front Sensor," J. Opt. Soc. Amer. A-Opt. Image Sci & Vision 11, 1949-1957 (1994).

Liang, J. Z., et al., "Supernormal vision and high-resolution retinal imaging through adaptive optics," *Journal of the Optical Society of America*, 14(11):2884-2892 (Nov. 1997).

Liu, H., and Lalanne, P., "Microscopic theory of the extraordinary optical transmission," Nature, 452:728-731 (2008).

Liu, Shaorong R., "A microfabricated hybrid device for DNA sequencing," Electrophoresis 2003, vol. 24, No. 21, pp. 3755-3761 (2003).

Marquet, Pierre, et al., "Digital holographic microscopy: a noninvasive contrast imaging technique allowing quantitative visualization of living cells with subwavelength axial accuracy," *Optics Letters*, vol. 30, No. 5, pp. 468-470 (Mar. 2005).

Mehta, S. B., et al., "Quantitative phase-gradient imaging at high resolution with asymmetric illumination-based differential phase contrast," Optics Letters, vol. 34, pp. 1924-1926 (2009).

Minakawa, K., et al.,"Microchamber Device Equipped with Complementary Metal Oxide Semiconductor Optical Polarization Analyzer Chip for Micro Total Analysis System," *Jpn. J. Appl. Phys.*, 48:04C192 (2009).

Murphy, et al., "Differential Interference Contrast (DIC)," available from Nikon MicrocopyU: at http://www.microscopyu.com/articles/dic/dicindex.html (2007).

Ng, R., et al., "Light field photography with a hand-held plenoptic camera," Computer Science Technical Report CSTR, vol. 2 (2005).

Nott, Prabhu R., et al., "Pressure-driven flow of suspensions: simulation and theory," (1994), *J. Fluid Mech.*, vol. 275, pp. 157-199.

Nozokido, Tatsuo, et al., "Scanning Near-Field Millimeter-Wave Microscopy Using a Metal Slit as a Scanning Probe," *IEEE Transactions on Microwave Theory and Techniques*, vol. 49, No. 3, 491-99 (2001).

Ogg et al., "The C. elegans PTEN homolog, DAF-18, acts in the insulin receptor-like metabolic signaling pathway," Mol. Cell 2, 887-893 (1998).

Pacifici, D., et al., "All-optical modulation by plasmonic excitation of CdSe quantum dots," Nature photonics, vol. 1, pp. 402-406 (2007).

Pacifici, D., et al., "Quantitative determination of optical transmission through subwavelength slit arrays in Ag films: Role of surface wave interference and local coupling between adjacent slits," Physical Review B, vol. 77, p. 115411 (2008).

Pacifici, D., et al., "Universal optical transmission features in periodic and quasiperiodic hole arrays," Optics Express, vol. 16, pp. 9222-9238 (2008).

Popescu, G., et al., "Diffraction phase microscopy for quantifying cell structure and dynamics," Optics Letters, vol. 31, pp. 775-777 (2006).

Popescu, G., et al., "Optical measurement of cell membrane tension," Physical Review Letters 97 (2006).

Preza, Chrysanthe, "Rotational-Diversity Phase Estimation from Differential-Interference Contrast Microscopy Images," J. Opt. Soc. Am. A, vol. 17, No. 3 (Mar. 2000).

Probstein, R. F., "Physicochemical Hydrodynamics," Wiley, 2nd Edition pp. 109-116, 123, 190-197, and 309-310 (2003).

Psaltis, Demetri, et al., "Developing optofluidic technology through the fusion of microfluidics and optics," *Nature*, vol. 442 (2006).

Rappaz, B., et al., "Measurement of the integral refractive index and dynamic cell morphometry of living cells with digital holographic microscopy," Optics Express, vol. 13, pp. 9361-9373 (2005).

Ren et al., (2012) "Quantitative Surface Normal Measurement by a Wavefront Camera," *Optics Letters* 37(2):199-201.

Rueckel, M., et al., "Adaptive wavefront correction in two-photon microscopy using coherence-gated wavefront sensing," Proceedings of the National Academy of Sciences of the USA, vol. 103, pp. 17137-17142 (2006).

Rust, M. J., et al., "Sub-diffraction-limit imaging by stochastic optical reconstruction microscopy (STORM)," Nature Methods, vol. 3, pp. 793-795 (2006).

Sarunic, V., et al., "Full-field swept-source phase microscopy," Optics Letters, vol. 31, pp. 1462-1464 (2006).

Schouten, H., et al., "Plasmon-assisted two-slit transmission: Young's experiment revisited," Physical Review Letters, vol. 94, p. 53901 (2005).

Schwiegerling, Jim, and Neal, Daniel, "Historical development of the Shack-Hartmann wavefront sensor," in Robert Shannon and Roland Shack: Legends in Applied Optics, edited by J. E. Harvey and R. B. Hooker_SPIE, Bellingham, WA, pp. 132-139 (2005).

Shi, X., et al., "Ultrahigh light transmission through a C-shaped nanoaperture," Optics letters, vol. 28, pp. 1320-1322 (2003).

Sommer, R.J, and Sternberg, P.W., "Changes of induction and competence during the evolution of vulva development in nematodes," Science 265, pp. 114-118 (1994).

Stanley, S.L., "Amoebiasis," *Lancet* 361, pp. 1025-1034 (2003).

Tai, Y. C., et al., "Integrated micro/nano fluidics for mass-spectrometry protein analysis," *International Journal of Nonlinear Sciences and Numerical Simulation*, 3(34):739-741 (2002).

Tegenfeldt, Jonas O., et al., "Micro- and nanofluidics for DNA analysis," Analytical and Bioanalytical Chemistry, vol. 378, No. 7, pp. 1678-1692 (2004).

Tegenfeldt, Jonas O., et al., "Near-field Scanner for Moving Molecules," Physical review letters, vol. 86, No. 7, pp. 1378-1381 (Feb. 2001).

Thio, T., et al., "Enhanced light transmission through a single subwavelength aperture," *Opt. Lett.*, 26:1972-1974 (2001).

Thio, T., et al., "Giant optical transmission of sub-wavelength apertures: physics and applications," Nanotechnology, vol. 13, pp. 429-432 (2002).

Thompson, Russell E., et al., "Precise nanometer localization analysis for individual fluorescent probes," Biophysical Journal, vol. 82, No. 5, pp. 2775-2783 (May 2002).

Tokeshi, Manabu, et al., "Chemical processing on microchips for analysis, synthesis, and bioassay," Electrophoresis, vol. 24, No. 21, pp. 3583-3594 (2003).

Trau, D., et al., "Genotyping on a complementary metal oxide semiconductor silicon polymerase chain reaction chip with integrated DNA microarray," Analytical Chemistry, vol. 74, No. 13, pp. 3168-3173 (2002).

Trent et al., "Egg laying defective mutants of the nematode Caenorhabditis elegans," Genetics 104, 619-647 (1983).

Ung, B., and Sheng, Y., "Optical surface waves over metallo-dielectric nanostructures: Sommerfeld integrals revisited," Optics Express, vol. 16, pp. 9073-9086 (2008).

Wang et al., "Characterization of acceptance angles of small circular apertures," Optics Express 17 (26), 23903-23913, 2009.

Wu (2007) Harmonically Matched Grating-Based Full-Field Quantitative High-Resolution Phase Microscope for Observing Dynamics of Transparent Biological Samples, *Optics Express*, 15(26):18141-55.

Wu, J. G., et al., (Apr. 2007) "Full field phase imaging using a harmonically matched diffraction grating pair based homodyne quadrature interferometer," *Applied Physics Letters*, 90:151123-1—151123-3.

Wu, J., Cui, X., Lee, L. M., and Yang, C., (2008) "The application of Fresnel zone plate based projection in optofluidic microscopy," *Opt. Exp.* 16(20):15595-155602.

(56) References Cited

OTHER PUBLICATIONS

Yaqoob, Z., "Harmonically-related diffraction gratings-based interferometer for quadrature phase measurements," Optics Express, vol. 14, pp. 8127-8137 (2006).

Zernike, F., "Phase contrast, a new method for the microscopic observation of transparent objects," Physics 9, pp. 686-698 (1942).

Zernike, F., "Phase contrast, a new method for the microscopic observation of transparent objects, Part II", Physics IX, No. 10, pp. 974-986 (Dec. 1942).

Zheng et al., "Pixel level optical-transfer-function design based on the surface-wave-interferometry aperture," Optics Express 18 (16), 16499-16506, 2010.

Zheng et at., "Improving Weak-Signal Identification via Predetection Background Suppression by a Pixel-Level, Surface-Wave Enabled Dark-Field Aperture," Optics Letters 35 (15), 2636-2638, 2010.

Zheng, et al., "Surface-wave-enabled darkfield aperture: A method for suppressing background during weak signal detection," *PNAS USA*, 107(20):9043-9048 (May 2010).

* cited by examiner

LIGHT-FIELD PIXEL FOR DETECTING A WAVEFRONT BASED ON A FIRST INTENSITY NORMALIZED BY A SECOND INTENSITY

CROSS-REFERENCES TO RELATED APPLICATIONS

This is a non-provisional application of, and claims priority to, U.S. Provisional Patent Application No. 61/430,690 entitled "Pixel-Integrated Optical Structure Designs for CMOS Image Sensor" filed on Jan. 7, 2011. This provisional application is hereby incorporated by reference in its entirety for all purposes.

The following non-provisional patent application is being filed on the same day and is hereby incorporated by reference in its entirety for all purposes: U.S. patent application Ser. No. 13/344,550, filed on Jan. 5, 2012, entitled "Surface Wave Assisted Structures and Systems".

BACKGROUND OF THE INVENTION

Embodiments of the present invention generally relate to wavefront (phase gradient) detecting devices. More specifically, embodiments relate to a light-field pixel for detecting a wavefront. The light-field pixel includes an aperture layer covering a light detector layer (e.g., layer having a complementary metal-oxide-semiconductor (CMOS) imaging sensor array). The aperture layer includes a conventional aperture and a non-conventional aperture. The non-conventional aperture is designed to generate a higher gradient of transmission at normal incidence than the conventional aperture. A conventional aperture has a gradient of transmission close to zero at normal incidence. To isolate the phase gradient from the amplitude information, the intensity of light through the non-conventional aperture is normalized by the intensity of light through the conventional aperture.

An optical microscopy image contains two major types of image information: light amplitude and optical phase spatial distribution. Amplitude image information is readily extractable as optical detectors, ranging from our retina layers to a CCD camera, are sensitive to light intensity—the square of the light amplitude. From the light amplitude variations, we can discern scattering structures, fluorophore sites, absorption sites and other relevant structures in the sample. Acquiring light amplitude spatial distribution is the primary function of a conventional microscope.

Unlike the light amplitude distribution, the optical phase distribution associated with a microscope image is more difficult to extract. Generally, optical phase detection requires the use of interferometry to encode the phase into amplitude variations. This entails the use of more elaborate optical arrangements. Phase information is useful as the optical phase delay is a sensitive measure of refractive index variations. As an example, a phase sensitivity of 5 degrees at wavelength 600 nm translates to an ability to discern a refractive index variation of 10-3 in a 10 micron thick sample.

In the biomedicine setting, two phase microscopy methods dominate: phase contrast microscopy and DIC microscopy. The phase information that each provide is different. Phase contrast microscope tends to highlight locations of high scatter—it derives contrast by interfering scattered light components with unscattered light components. On the other hand, DIC microscope tends to highlight regions where the refractive index of the sample is rapidly changing. Both techniques can be adapted into a conventional microscopy setup. However, the requisite optical arrangements are elaborate and, as such, phase microscopes are expensive and relatively high maintenance. In addition, both techniques share a common shortcoming—in both cases, the phase information is inextricably mixed with the amplitude information. In other words, a dark spot in the acquired phase contrast or DIC image can be due to a corresponding absorptive spot on the sample or a phase variation—there is no way to distinguish the two effects without additional measurements. This shortcoming also prevents phase contrast and DIC from providing quantitative phase measurements.

Besides phase contrast and DIC microscopy, various full field quantitative phase imaging techniques have been recently developed. Some of the prominent techniques are: 1) phase shifting interferometry schemes—where two or more interferograms with different phase shifts are acquired sequentially and a phase image is generated from them, 2) digital holography or Hilbert phase microscopy—where high frequency spatial fringes encoded on the interferogram are demodulated to generate the phase image, 3) Swept-source phase microscopy—where modulation in the interferogram generated by a wavelength sweep can be processed to create a phase image, 4) Polarization quadrature microscopy—where phase images are generated by a polarization based quadrature interferometer, and 5) Harmonically matched grating-based phase microscopy—which makes use of non-trivial phase shifts between the different diffraction orders from a harmonic combination grating to generate phase images. These methods do provide quantitative phase information and have been demonstrated to perform well. However, as with phase contrast and DIC microscopy, most of these advanced methods contain significant optical elements and have relatively steep learning curves. In addition, this class of phase microscopy techniques invariably requires the use of a laser source to provide coherent light. In comparison, phase contrast and DIC microscopes work well with the usual standard microscope light sources.

BRIEF SUMMARY OF THE INVENTION

Embodiments of the present invention generally relate to a light-field pixel, an array of light field pixels, a light-field pixel system, and a method of wavefront (phase gradient) imaging using an array of light-field pixels. A light-field pixel can measure amplitude and/or phase variations of an image wavefront induced by the presence of an object in a light field. Each light-field pixel includes an aperture layer covering a light detector layer having light detecting elements (e.g., image sensor pixels). The aperture layer has an outer surface. In one case, the aperture layer includes two non-conventional apertures (e.g., slanting apertures or shifted apertures) and one or more conventional apertures (e.g., non-slanting apertures or non-shifted apertures). The non-conventional apertures are designed to generate a higher gradient of transmission at normal incidence than the conventional apertures which have a gradient of transmission close to zero at normal incidence. A light detecting element behind each aperture measures the local intensity of light. To isolate the phase gradient from the amplitude information, the local intensity measured at each non-conventional aperture may be normalized by the intensity of light measured at a conventional aperture located close to the non-conventional aperture. The amplitude at each light-field pixel can be determined by summing the local intensity measured at each of the apertures in the light-field pixel. The amplitude and/or phase variations measured by an array of light-field pixels can be used to generate wavefront images and other images of the object.

One embodiment is directed to a light-field pixel for detecting a wavefront. The light-field pixel comprises an aperture layer, a light detector layer, and a processor. The aperture layer has an outer surface, a non-conventional aperture, and a non-conventional aperture. The non-conventional aperture has a higher gradient of transmission at normal incidence than the conventional aperture. The light detector layer is configured to measure a first intensity of light through the non-conventional aperture and a second intensity of light through the conventional aperture. The processor is configured to detect the wavefront based on the first intensity normalized by the second intensity.

One embodiment is directed to a light-field pixel system comprising an array of light-field pixels and a light detector layer. Each light-field pixel comprises an aperture layer and a light detector layer. The aperture layer has an outer surface, first and second non-conventional apertures, and first and second conventional apertures. The non-conventional apertures have higher gradients of transmission at normal incidence than the gradient of transmission of the conventional apertures. The light detector layer is configured to measure a first intensity of light through the first non-conventional aperture, a second intensity of light through one of the first and second conventional apertures, a third intensity of light through the third non-conventional aperture, and a fourth intensity of light through the other one of the first and second conventional apertures. The processor is configured to detect a wavefront in a first orthogonal direction based on a first intensity normalized by the second intensity and in a second orthogonal direction based on the third intensity normalized by the fourth intensity.

One embodiment is directed to light-field pixel comprising and aperture layer and a light detector layer. The aperture layer has an outer surface, a first slanting aperture oriented at a first angle through the aperture layer, a second slanting aperture oriented at a second angle through the aperture layer, and first and second non-slanting apertures. The light detector layer is configured to detect a wavefront in a first direction based on a first intensity of light through the first slanting aperture normalized by a second intensity of light through one of the first and second non-slanting apertures, and detect the wavefront in a second direction based on a third intensity of light through the second slanting aperture normalized by a fourth intensity of light through another one of the first and second non-slanting aperture.

One embodiment is directed to a light-field pixel comprising an aperture layer and a light detector layer. The aperture layer has an outer surface, a first shifted aperture having a first offset, a second shifted aperture having a second offset, and first and second non-shifted apertures. The light detector layer is configured to detect a wavefront in a first direction based on a first intensity of light through the first shifted aperture normalized by a second intensity of light through one of the first and second non-shifted apertures, and detect the wavefront in a second direction based on a third intensity of light through the second shifted aperture normalized by a fourth intensity of light through another one of the first and second non-shifted apertures.

One embodiment is directed to a method of detecting a wavefront at a light-field pixel having an aperture layer and a light detector layer, the aperture layer having a non-conventional aperture and conventional aperture. The method comprises receiving a wavefront at the aperture layer and measuring, at the light detector layer, a first intensity of light through a non-conventional aperture and a second intensity of light though a conventional aperture. The non-conventional aperture has a higher gradient of transmission at normal incidence than the approximately zero gradient of transmission of the conventional aperture. The method also comprises normalizing the first intensity of light by the second intensity of light and with a processor, mapping the normalized intensity to an incident angle using a calibration curve, and detecting the wavefront by determining a phase gradient based on the incident angle.

These and other embodiments of the invention are described in further detail below.

DETAILED DESCRIPTION OF THE INVENTION

Figure 1:
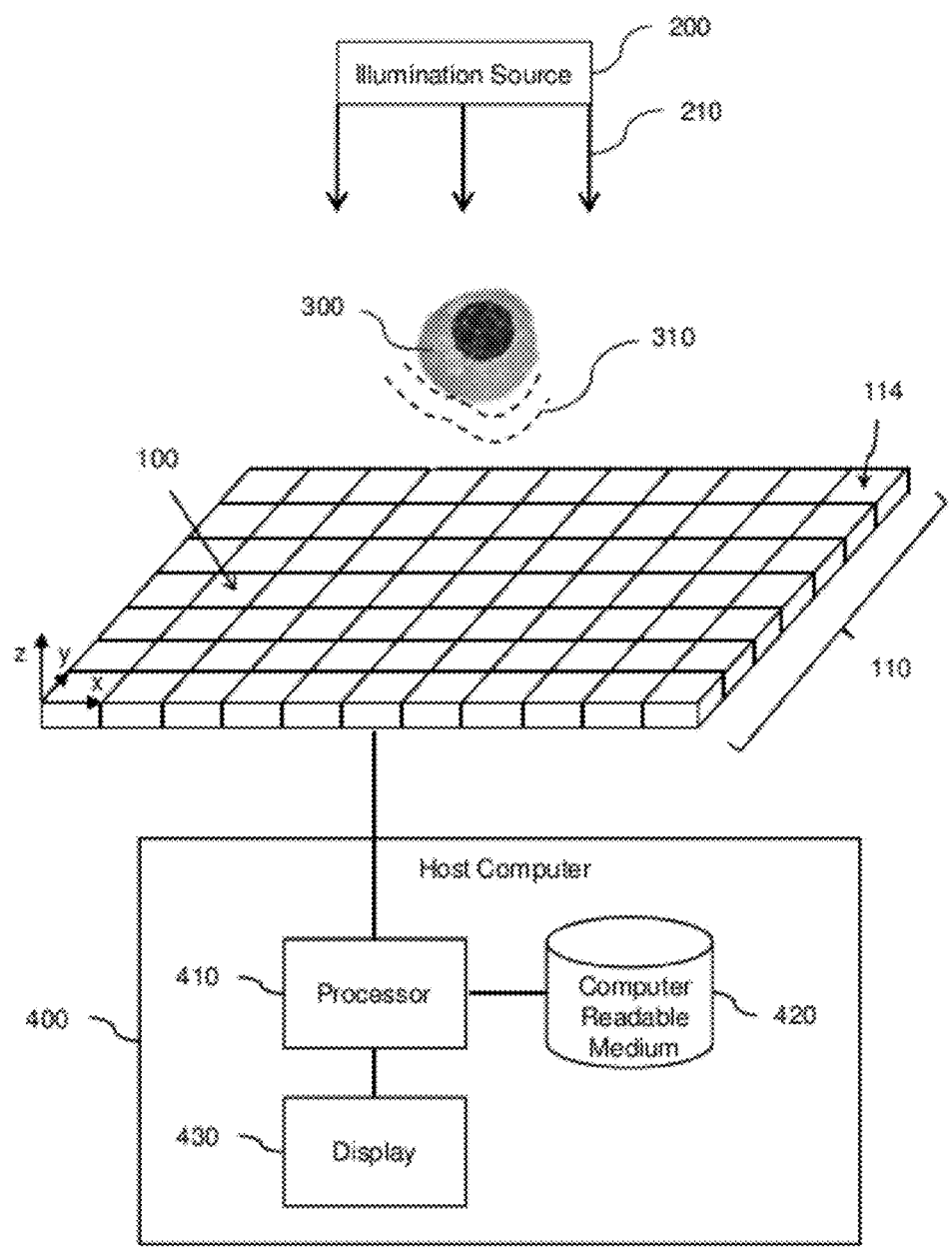
FIG. 1 is a schematic diagram of components and partial components of a light-field pixel system, according to embodiments of the invention.

Embodiments of the present invention will be described below with reference to the accompanying drawings. Embodiments include a light-field pixel that can detect an image wavefront induced by the presence of an object in a light field. The light-field pixel includes an aperture layer covering a light detector layer with light detecting elements (e.g., image sensor pixels). The aperture layer has an outer surface. The light-field pixel of embodiments includes four apertures over four corresponding light detecting elements. Two of the apertures are non-conventional apertures and two are conventional apertures having a longitudinal axis normal to an outer surface. The non-conventional apertures are designed to generate a higher gradient of transmission at normal incidence than the conventional apertures which have a gradient close to zero at normal incidence. In one design, a light-field pixel uses a slanting-aperture based wavefront imaging technique. A light-field pixel using this technique has two slanting apertures and one or more non-slanting (conventional) apertures. The first slanting aperture has a longitudinal axis oriented at a first angle through the aperture layer and in a first plane normal to the outer surface. The second slanting aperture has a longitudinal axis oriented at a second angle through the aperture layer and in a second plane normal to the outer surface. The first plane is orthogonal to the second plane. In another design, a light-field pixel uses a shifted-aperture based wavefront imaging technique. A light-field pixel using this technique has two shifted apertures which are offset in orthogonal directions (e.g., x-direction and y-direction) from being centered over corresponding light detecting elements.

In operation, the array of light-field pixels receives an image wavefront induced by an object in a light-field. Light detecting elements behind the apertures measure the local intensity of light projected through the apertures in the light-field pixel. The local intensity measured by the light detecting elements is associated with both phase and amplitude information. To decompose the phase information from the measured local intensity, the local intensity measured at the non-conventional (slanting/shifted) apertures is normalized by the intensity of light through the conventional (non-slanting/non-shifted) apertures in the light-field pixel. The normalized intensities are mapped to incident angles associated with the phase gradients in two dimensions using calibration tables. The amplitude can be determined from the sum of the local intensities through all the apertures in the light-field pixel. The amplitude and/or phase variations measured by an array of light-field pixels can be used to generate wavefront images and other images of the object.

Embodiments of the invention provide one or more technical advantages. One important advantage of this system is the number of light detecting elements (e.g., image sensor pixels) used for every light field pixel. In embodiments of this system, a grid of 2×2 light detecting elements can be used as one light-field pixel. Other conventional methods used a grid of 10×10 light detecting elements. That is, the light-field pixel of embodiments of this system has 25 times more pixels than conventional methods. Another advantage of this system may be that it can be used to implement wavefront detecting/imaging functionality by simply adding an aperture layer onto a simple sensor chip such as a CMOS sensor chip. In some cases, the aperture layer can be added as part of the sensor chip fabrication process, which minimizes the cost of the added functionality. This implementation may be advantageous over conventional wavefront detection devices that use bulky optical elements to provide similar functionality. Since there are no bulky optical elements, the light-field pixel system can be more robust (less optical elements to break), less expensive, and simpler in use and design than conventional wavefront detection devices. Another advantage of a system using light-field pixels of embodiments may be that it does not require polarized illumination as part of its imaging technique. Since it does not depend on the polarization of the illumination, the imaging device can use illumination light to generate artifact-free phase gradient and intensity images for both birefringent and homogenous objects. Also, an ordinary illumination source can be used such as the illumination source used in a conventional microscope.

I. Light-Field Pixel System

FIG. 1 is a schematic diagram of components and partial components of a light-field pixel system 10, according to embodiments of the invention. The light-field pixel system 10 includes light-field pixels 100 in the form of a two-dimensional array of light-field pixels 110 having an outer surface 114. The light-field pixel system 10 also includes an illumination source 200 providing illumination 210 to an object 300, which induces an image wavefront 310. The light-field pixel system 10 also includes an x-axis, a y-axis, and a z-axis. The x-axis and y-axis lie in a plane at the outer surface 114. The z-axis is orthogonal to the plane at the outer surface 114.

The light-field pixel system 10 also includes a host computer 400 having a processor 410, a computer readable medium (CRM) 420 in electronic communication with the processor 410, and a display 430. The processor 410 is also in electronic communication with the array of light-field pixels 100 to receive a signal with data associated with the wavefront 310. The processor 410 is also in electronic communication with the display 430 to display images of the object 300 based on the data associated with the wavefront 310.

In an exemplary imaging operation of the light-field pixel system 10 of FIG. 1, the illumination source 200 provides illumination 210 to the object 310 which induces a wavefront 310. The array of light-field pixels 110 receives light associated with the wavefront 310. The array of light-field pixels measure two-dimensional phase gradient information and/or amplitude information associated with the wavefront 310. The processor 410 receives a signal from the array of light-field pixels 100 with two-dimensional phase gradient and amplitude information and generates image data for displaying one or more wavefront or other images of the object 310 on the display 430.

In FIG. 1, the array of light-field pixels 110 is a two-dimensional array having the dimensions of 11×7. Although the array of light-field pixels 100 is a single two-dimensional array in the illustrated example, the array of light-field pixels 110 may be in the form of a one-dimensional array, a multitude of one-dimensional and/or two-dimensional arrays, or other suitable arrangements of light-field pixels 100 in other embodiments of the invention. The array of light-field pixels 110 may have any suitable dimensions (e.g. 100×100, 10×100, 1000×20, 1000×1000 etc.).

A light-field pixel 100 can refer to a multi-layer structure having an aperture layer 120 covering a light detector layer 130. The layers are configured to detect a wavefront 310 induced by an object 300 in a light-field. An aperture layer 120 can refer to an opaque or semi-opaque layer of any suitable material having any suitable thickness (e.g., a thin metallic layer) with any suitable number of apertures 122.

The light detector layer 130 can refer to a multi-layered or monolithic structure configured to measure light passing through the apertures in the aperture layer 120 and generate a signal(s) with data associated with the received light. If the aperture layer 120 is a multi-layered structure, the layers may be made of any appropriate material(s) having any suitable thickness and orientation.

A light detecting element 132 refers to a structure or device capable of detecting light and generating signals with data about the local intensity of the impinging light, and/or other information about the received light. The signals may be in the form of electrical current that results from the photoelectric effect. Some examples of suitable light detecting elements 132 include elements (pixels) of a complementary metal-oxide-semiconductor (CMOS) array, a charge coupled device (CCD), photodiodes (e.g., avalanche photodiodes (APDs)), and photomultiplier tubes (PMTs). Each light detecting element 132 may be of any suitable size (e.g., 1-4 microns) and any suitable shape (e.g., circular or square). The light detecting elements 132 may be in any suitable arrangement in the light detector layer 130 such as in an array(s) (e.g., one-dimensional array, a two-dimensional array and a multitude of one-dimensional and/or two-dimensional arrays). The light detecting elements 132 can be arranged in the similar form to the apertures 122 of the light-field pixel 100 and map to the apertures 122. For example, each aperture 122 of the light-field pixel 100 may uniquely correspond to a single light detecting element 132 and generally measures the light projected through specific aperture 122. In other examples, other suitable numbers of light detecting elements 132 may correspond to a single aperture 122.

The aperture layer 120 of each light-field pixel 100 includes one or more conventional apertures and one or more non-conventional apertures. In illustrated embodiments, the aperture layer 120 of a light-field pixel 100 includes two conventional apertures and two non-conventional apertures. Generally, an aperture 122 can refer to a light transmissive region (e.g., a hole, which can be a void or filled with a transparent material). The aperture 122 can have any suitable cross-sectional shape (e.g., a circle, rectangle, triangle, oval, etc.) and any suitable size (e.g., diameter of 1 micron, 3 microns, 6 microns, etc.).

A conventional aperture can refer to an aperture that has a gradient of transmission versus incident angle that may be zero or approximately zero at normal incidence to the outer surface 114 of the aperture layer 130. A conventional aperture of embodiments may be an aperture having a longitudinal axis normal to the outer surface 114 of the aperture layer 130 in the light field pixel 100. Also, the longitudinal axis may be located through the center of the corresponding light detecting element 132 in the light detector layer 130. Some illustrated examples of conventional apertures include the non-slanting/non-shifted apertures 122(b)(1) and 122(b)(2) shown in FIGS. 2(a), 2(b), 2(c), 3, 6(a), 6(b), 6(c), and 7.

A non-conventional aperture can refer to an aperture that may be designed to have a non-zero transmission versus incident angle at normal incidence to the outer surface 114 of the aperture layer 130. In some cases, a suitable value of the gradient of transmission at normal incidence for the non-conventional aperture may be any non-zero value. In some cases, a suitable value of the gradient of transmission at normal incidence for the non-conventional aperture may be any value that is higher than the value of the gradient of transmission through a conventional aperture in the same light-field pixel 100. An example of a suitable value of a gradient of transmission at normal incidence that can be used to design a non-conventional aperture may be 2.5% intensity change per degree. The comparatively higher gradient of transmission at normal incidence exhibited by the non-conventional aperture in a light-field pixel can be used to measure the phase gradient to detect the wavefront 310.

The non-conventional aperture may be designed to have a non-zero gradient at normal incidence by locating or orienting the aperture to project light at normal incidence onto a less sensitive area of the corresponding light detecting element (i.e. away from the center portion of the light detecting element). For example, a non-conventional aperture may be aperture having a longitudinal axis at an angle through the thickness of the aperture layer. Some illustrated examples non-conventional slanting apertures 122(a)(1) and 122(a)(2) are shown in FIGS. 2(a), 2(b), 2(c), and 3. As another example, a non-conventional aperture may be an aperture that is offset from the centerline of the associated light detecting element. Some illustrated examples of non-conventional shifted apertures 122(c)(1) and 122(c)(2) are shown in FIGS. 6(a), 6(b), 6(c), and 7.

Although the light-field pixel 100 may include any suitable number of non-conventional and conventional apertures in any suitable arrangement, the light-field pixel 100 of illustrated examples includes two non-conventional apertures (first and second non-conventional apertures) and two conventional apertures (first and second conventional apertures). Each non-conventional aperture of the light-field pixel 100 may be designed to have a gradient of transmission versus incident angle at normal incidence that is higher than the gradient of transmission through the one or more conventional apertures in the light-field pixel 100. In one case (slanting-aperture based wavefront imaging technique), the two non-conventional apertures are slanted at an angle through the thickness of the aperture layer 120. In a second case (shifted-aperture based wavefront imaging technique), the two non-conventional apertures are shifted by an offset. The intensity of light through the slanting/shifted apertures may be normalized by the intensity of light transmitted through the conventional aperture(s) 122 to isolate the phase gradient contribution.

A normalized intensity can refer to the local intensity of light through a non-conventional aperture as normalized by the local intensity of light through an associated conventional aperture. First and second normalized intensities refer to the intensities of light through the two non-conventional apertures respectively as normalized by the intensity of light through a conventional aperture in the same light-field pixel 100. In embodiments, the first and second non-conventional apertures are located/oriented to measure phase gradient in orthogonal directions in the plane at the outer surface. In these embodiments, the first and second normalized intensities are related to the phase gradient in two orthogonal directions.

Figure 2A:
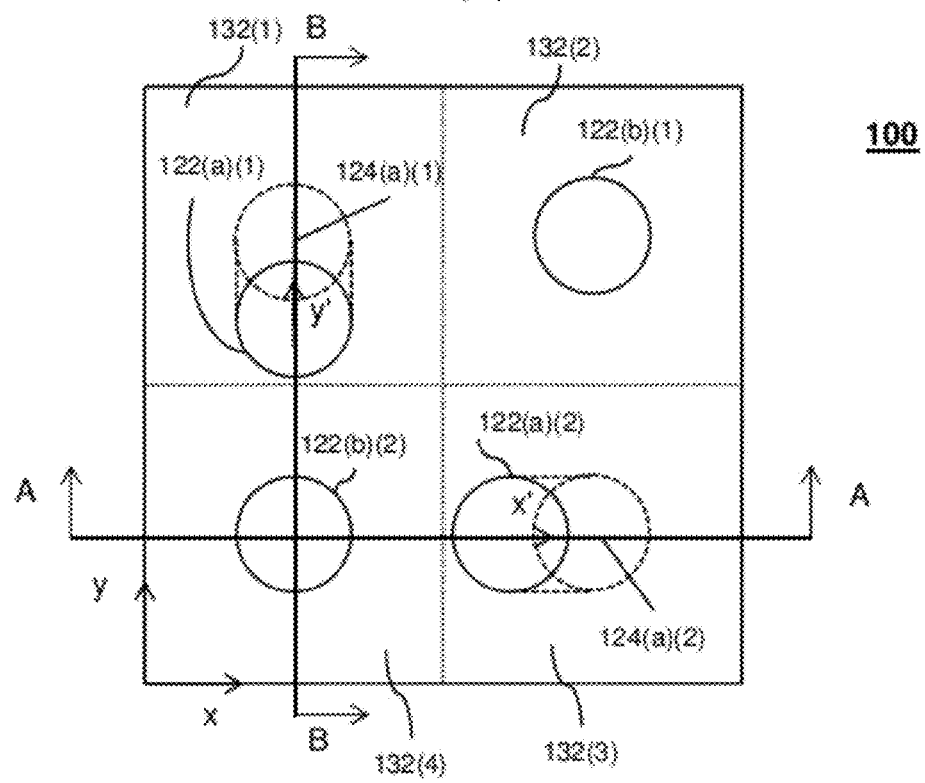
FIG. 2(a) is schematic drawing of a top view of a light-field pixel using the slanting-aperture based wavefront imaging technique, according to an embodiment of the invention.
Figure 2B:
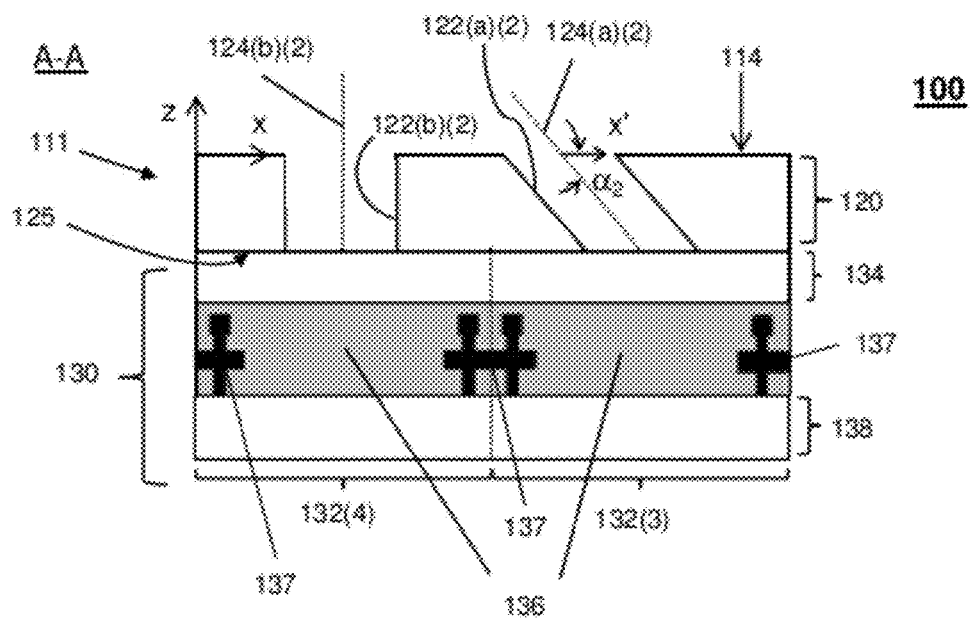
FIG. 2(b) is a schematic drawing of a cross section A-A of the light-field pixel of FIG. 2(a) showing some of the details of the light-field pixel, according to an embodiment of the invention.
Figure 2C:
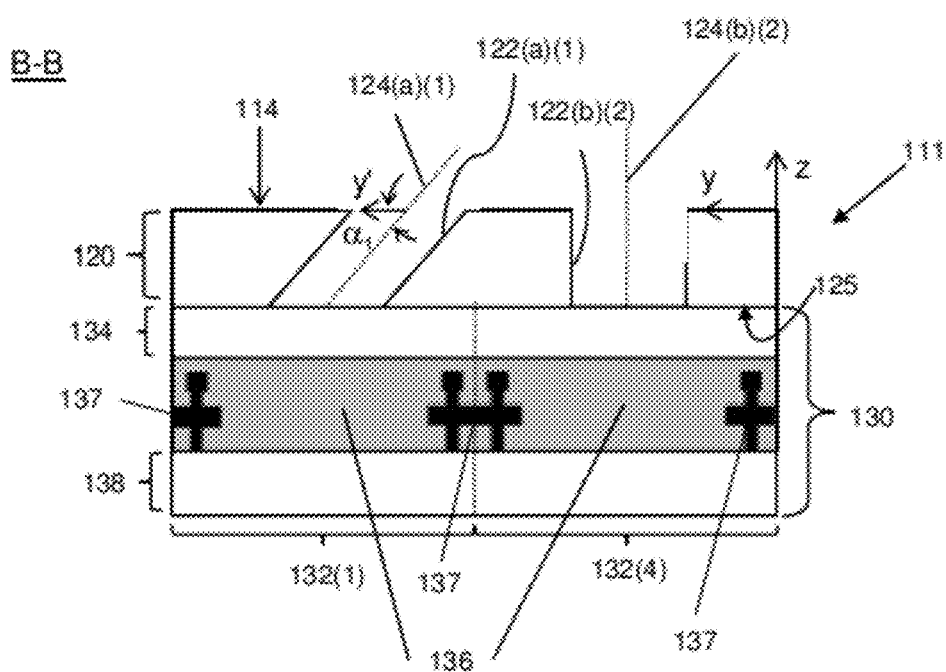
FIG. 2(c) is a schematic drawing of a cross section B-B of the light-field pixel of FIG. 2(a) showing some of the details of the light-field pixel, according to an embodiment of the invention.

FIG. 2(a) is schematic drawing of a top view of a light-field pixel 100 using the slanting-aperture based wavefront imaging technique, according to an embodiment of the invention. FIG. 2(b) is a schematic drawing of a cross section A-A of the light-field pixel 100 of FIG. 2(a) showing some of the details of the light-field pixel 100, according to an embodiment of the invention. FIG. 2(c) is a schematic drawing of a cross section B-B of the light-field pixel 100 of FIG. 2(a) showing some of the details of the light-field pixel 100, according to an embodiment of the invention. In the illustrated example, the light-field pixel 100 includes a multi-layered body 111 comprising an aperture layer 120 having the outer surface 114 and an inner surface 125, and a light detector layer 130 to the inside of the aperture layer 120. The light detector layer 130 includes a 2×2 grid of four light detecting element elements 132 (e.g., image sensor pixels) in the light detector layer 130.

The four light detecting elements 132 include a first light detecting element 132(1), a second light detecting element 132(2), a third light detecting element 132(3), and a fourth light detecting element 132(4). The light-field pixel 100 also includes an x-axis, a y-axis, and a z-axis. The x-axis and y-axis lie in the plane at the outer surface 114. The z-axis is orthogonal to the plane at the outer surface 114.

In FIGS. 2(a), 2(b), and 2(c), the aperture layer 120 includes two non-conventional apertures: a first slanting aperture 122(a)(1) having a longitudinal axis 124(a)(1) and a second slanting aperture 122(a)(2) having a longitudinal axis 124(a)(2). The aperture layer 120 also includes two conventional apertures: a first non-slanting aperture 122(b)(1) having a longitudinal axis 124(b)(1) and a second non-slanting aperture 122(b)(2) having a longitudinal axis 124(b)(2). The light-field pixel 100 also includes an y'-axis in the y-direction and at a y-z plane through the center of first slanting aperture 122(a)(1). The light-field pixel 100 also includes an x'-axis in the x-direction and at a x-z plane through the center of second slanting aperture 122(a)(2). The light-field pixel 100 also includes an y'-axis in the y-direction and at a y-z plane through the center of first slanting aperture 122(a)(1).

A slanting aperture 122(a) of embodiments can refer to an aperture that has a longitudinal axis 124(a) oriented at an angle, a, to an axis (e.g. x'-axis or y'-axis) lying in the plane of the outer surface 114 and that is in a plane (e.g., x-z plane or y-z plane) normal to the outer surface 114. The angle, α, can be any suitable angle (e.g., −25-, −20, −15, −10, −5, 5, 10, 15, 20, etc.). Although the slanting aperture 122(a) may be at any suitable location in the aperture layer 120 to project light onto the associated light detecting element(s) 132, in some cases, the slanting aperture 122(a) may be located so that the intersection of the slanting aperture 122(a) and the inner surface 125 is centered over the associated light detecting element 124. By slanting the aperture, light projected through the slanted aperture at normal incidence will be received at an off-center location on the light detecting element. Since only a center portion (e.g., 40% of the surface area) of the photosensitive layer 138 of each light detecting element 132 may be sensitive in some cases, shifting the projection may move the projection to a less sensitive area, which may reduce the intensity of light at normal incidence. This will generate a higher gradient of transmission at normal incidence than a conventional aperture would. By centering the inside of the slanted aperture over the corresponding light detecting element 132, light projected at about half the slanting angle, α, of the longitudinal axis 124 of the slanted aperture 122(a) will result in maximum intensity. For example, if the slanting angle, α, is 30 degrees, the maximum intensity angle is about 30/2=15 degrees.

In FIGS. 2(a), 2(b), and 2(c), the first slanting aperture 122(a)(1) has a longitudinal axis 124(a)(1) that lies at an angle $α_1$ with respect to the y'-axis in the y-direction the second slanting aperture 122(a)(2) has a longitudinal axis 124(a)(2) that lies at an angle $α_2$ with respect to the x'-axis in the x-direction. In this illustrated example, the intersection of the slanting apertures 122(a)(1) and 122(a)(2) with the inner surface 125 is centered over their associated light detecting element 124.

A non-slanting aperture 122(b) of embodiments can refer to a conventional aperture with a longitudinal axis 124(b) that is normal to the plane at the outer surface 114. Generally, the non-slanting aperture 122(b) of embodiments may be located and centered about the center of a single corresponding light detecting element 132. The non-slanting aperture 122(b) and its corresponding light detecting element 132 are associated with one or more slanting apertures 122(a) and their corresponding light detecting elements 132 for wavefront detection purposes. That is, the measured local intensity of light through the non-slanting aperture 122(b) may be used to normalize the measured local intensity of light through the associated slanting aperture 122(a). The non-slanting aperture 122(b) may be fabricated close the associated slanting aperture 122(a) so that the intensity of incoming light does not dramatically change between the non-slanting aperture 122(b) and the associated slanting aperture 122(a).

In FIGS. 2(a), 2(b), and 2(c), the first non-slanting aperture 122(b)(1) has a longitudinal axis 124(b)(1) normal to a plane at the outer surface 114 and the second non-slanting aperture 122(b)(2) has a longitudinal axis 124(a)(2) normal to a plane at the outer surface 114. The first and second non-slanting apertures 122(b)(1) and 122(b)(2) are centered above associated light detecting elements 132(2) and 132(4) respectively. The first non-slanting aperture 122(b)(1) and its corresponding second light detecting element 132(2) are associated with the first slanting aperture 122(a)(1) and its corresponding first light detecting element 132(2) for normalizing the intensity of light through the first slanting aperture 122(a)(1). The second non-slanting aperture 122(b)(2) and its corresponding fourth light detecting element 132(4) are associated with the second slanting aperture 122(a)(2) and its corresponding third light detecting element 132(3) for normalizing the intensity of light through the second slanting aperture 122(a)(2).

In embodiments, a first axis can refer to an axis in a first direction (e.g., the x-direction or the y-direction) that lies in the plane of the outer surface 114 and goes through the longitudinal axis of a slanting aperture 122(a) (e.g., goes through the center of the second slanting aperture 122(a)(2) at the outer surface 114). For example, the first axis may be the x'-axis shown in FIGS. 2(b) and 3 in some cases. A second axis can refer to an axis perpendicular to the first axis, and that is in a second direction (e.g., the y-direction or the y-direction) and lies in the plane of the outer surface 114. For example, the second axis may be the y'-axis shown in FIG. 2(c) in some cases.

The light detector layer 130 shown in FIGS. 2(b) and 2(c) is a multi-layered structure of an image sensor comprised of a transparent layer 134 (e.g., a Polymethyl methacrylate (PMMA) layer), a dielectric stack layer 136 having interconnections 137, and a photosensitive layer 138 (e.g., silicon substrate layer). A transparent layer 134 can refer to a layer of suitable material(s) (e.g., polymethyl methacrylate (PMMA)) having any suitable thickness. The transparent layer 134 may optionally include microlenses 135 for focusing the light transmitted through the apertures 122. In some embodiments, the transparent layer 134 or the microlenses 135 may be omitted or removed. An interconnection 137 can refer to a structure or device for connecting the dielectric stack layers 136 at adjacent light detecting elements 132. A dielectric stack layer 136 can refer to one or more layers of dielectric material and optionally layers of other material(s).

The four apertures 122(a)(1), 122(b)(1), 122(a)(2), and 122(b)(2) uniquely correspond to the four light detecting elements 132(1), 132(2), 132(3), and 132(4) respectively. The first light detecting element 132(1) measures a first intensity of light through the first slanting aperture 122(a)(1). The second light detecting element 132(2) measures a second intensity of light through the first non-slanting aperture 122(b)(1). The third light detecting element 132(3) measures a third intensity of light through the second slanting aperture 122(a)(2). The fourth light detecting element 132(4) measures a fourth intensity of light through the second non-slanting aperture 122(b)(2). Although the light-field pixel 100 of illustrated embodiments include a 2×2 grid of four aperture-light detecting element pairs in a certain order/arrangement, other embodiments may include other suitable number of pairs and arrangements. Also, in other embodiments a plurality of light detecting elements 132 may be associated with each aperture 122.

Figure 3:
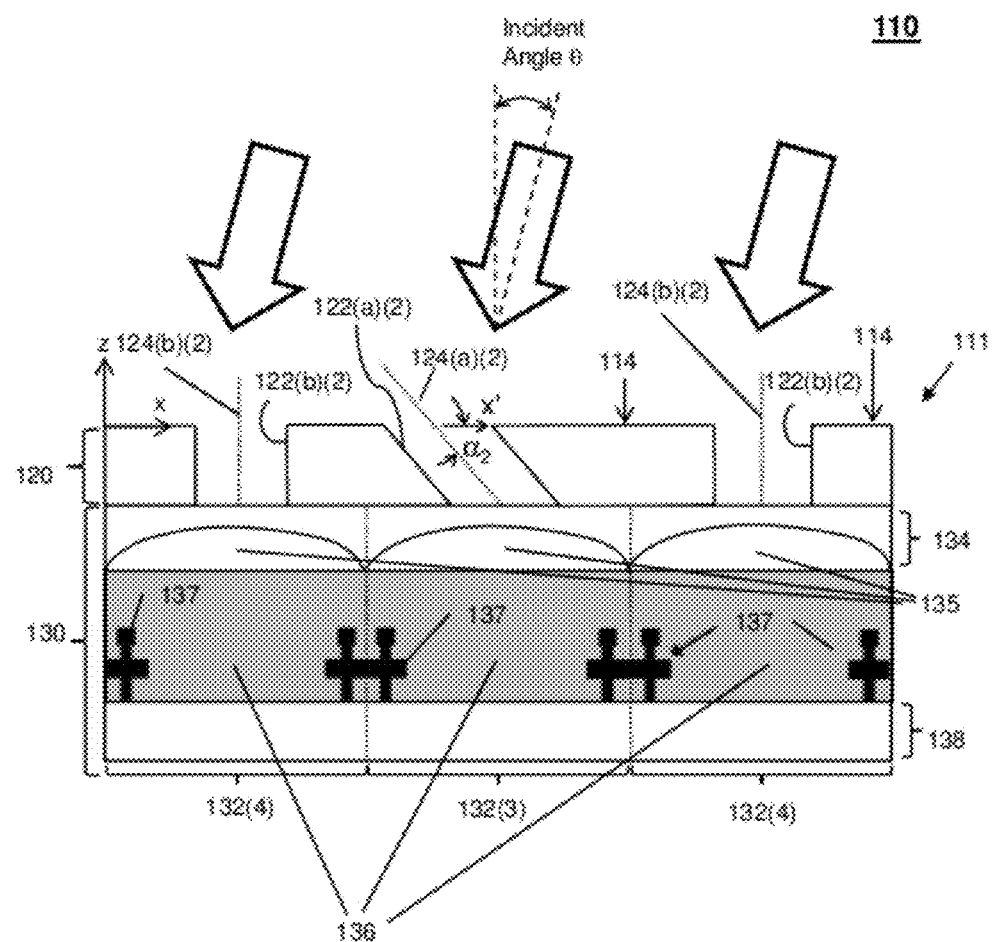
FIG. 3 is a schematic drawing of a cross sectional view at an x-z plane through the center of portions of two light-field pixels in an array of light-field pixels using the slanting-aperture based wavefront imaging technique, according to an embodiment of the invention.

FIG. 3 is a schematic drawing of a cross sectional view at an x-z plane through the center of portions of two light-field pixels 100 in an array of light-field pixels 110 using the slanting-aperture based wavefront imaging technique, according to an embodiment of the invention. The cross section shown in the illustrated example lies through the center of a second slanting aperture 122(b)(2) and the center of the second non-slanting aperture 122(b)(2). The portions of light-pixels 100 include a multi-layered body 111 having an aperture layer 120 with an outer surface 114 and a light detector layer 130 to the inside of the aperture layer 120. The light-field pixel 100 also includes an x-axis, a y-axis (not shown), and a z-axis. The x-axis and y-axis lie in a plane at the outer surface 114. The z-axis is orthogonal to the plane at the outer surface 114. In FIG. 3, an image wavefront impinges the aperture layer 120 at an incident angle, $\theta$.

In FIG. 3, the aperture layer 120 includes a slanting aperture 122(a)(2) and two non-slanting apertures 122(b)(2). The slanting aperture 122(a)(2) has a longitudinal axis 124(a)(2) in an x-z plane and lying at an angle, $\alpha_2$, with respect to a local x' axis in the x-direction. The x' axis and y' axis lie in the plane of the outer surface 114 and are perpendicular to each other. The two non-slanting apertures 122(b)(2) have a longitudinal axes 124(b)(2) normal to the outer surface 114.

The light detector layer 130 in FIG. 3 includes a transparent layer 134 having three optional microlenses 135, a dielectric stack layer 136 having interconnections 137, and a photosensitive layer 138. The cross section shown in FIG. 3 lies through three light detecting elements 132 of two light-field pixels 100. The three light detecting elements 132 include a third light detecting element 132(3) associated with the slanted aperture 122(a)(2) and two fourth light detecting elements 132(4) associated with second non-slanting apertures 122(b)(2) or two light-field pixels 100.

In embodiments using the slanted-aperture based wavefront imaging technique, a first normalized intensity can refer to the intensity of light through the second slanting aperture 122(a)(2) as normalized by the intensity of light through either the first non-slanting aperture 122(b)(1) or the second non-slanting aperture 122(b)(2). This normalized intensity may be related to the phase gradient in the y-direction. The second normalized intensity can refer to the intensity of light through the first slanting aperture 122(a)(1) as normalized by the intensity of light through either the first non-slanting aperture 122(b)(1) or the second non-slanting aperture 122(b)(2). The first normalized intensity is related to the incident angle in the x-z plane and the phase gradient in the x-direction. The second normalized intensity is related to the incident angle in the y-z plane and the phase gradient in the y-direction.

Figure 4:
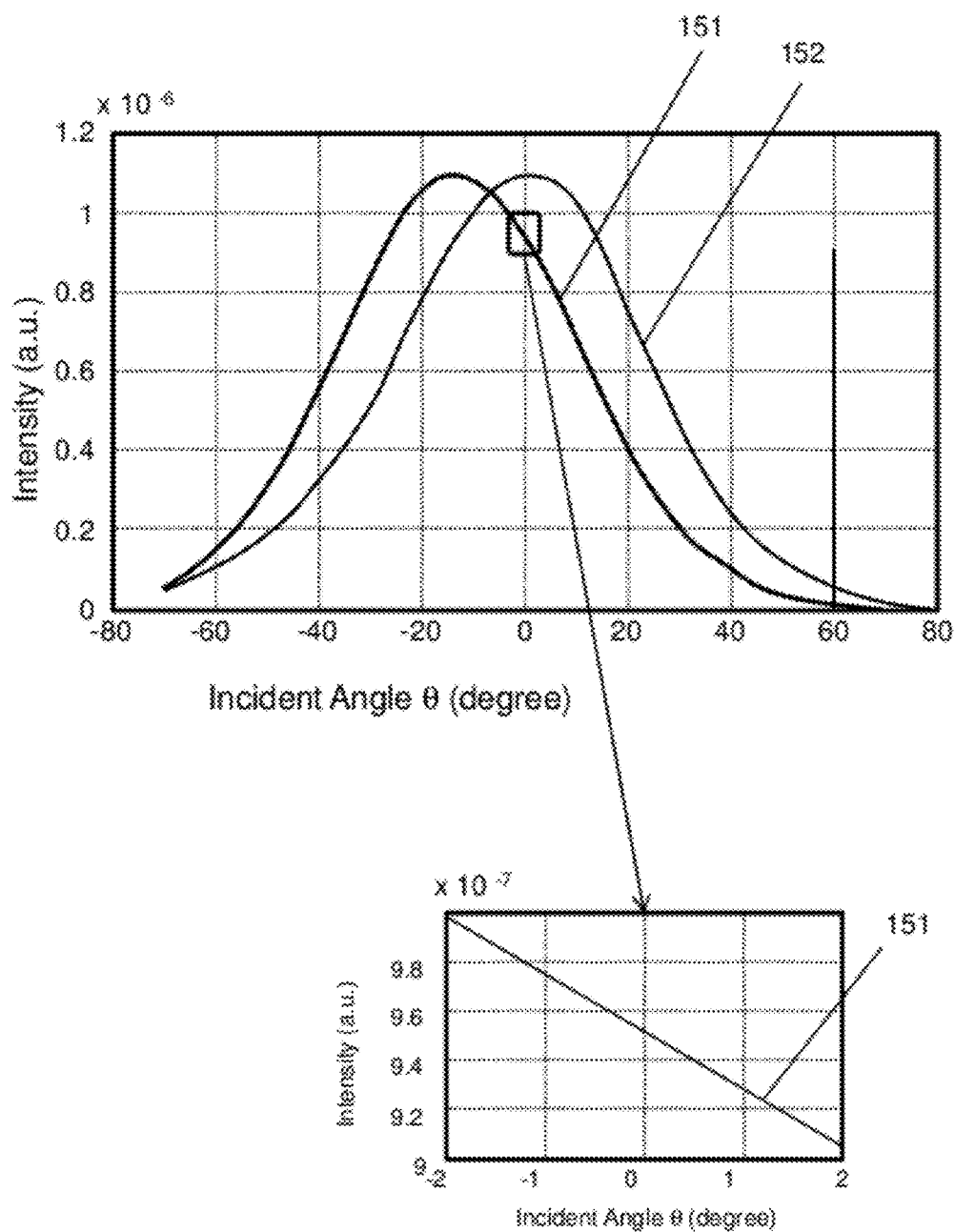
FIG. 4 is a graph of the results of a FDTD simulation showing the transmission of light through the slanting aperture of FIG. 3 at different incident angles, $\theta$, and an approximation of the transmission of light through one of the non-slanting apertures of FIG. 3 at different incident angles, $\theta$, according to an embodiment of the invention.

FIG. 4 is a graph of the results of a FDTD simulation showing the transmission of light through the slanting aperture 122(a)(2) of FIG. 3 at different incident angles, $\theta$, and an approximation of the transmission of light through one of the non-slanting apertures 122(b)(2) of FIG. 3 at different incident angles, $\theta$, according to an embodiment of the invention. The graph in FIG. 4 plots the intensity of the transmitted light versus incident angle of the incoming light for both the slanting aperture 122(a)(2) and non-slanting aperture 122(b)(2). The graph in FIG. 4 includes a first curve 151 of the intensity of transmitted light through the slanting aperture 122(a)(2) in FIG. 3 versus the incident angle, $\theta$, of the incoming light. As shown, the intensity of light transmitted through the slanting aperture 122(a)(2) increases as the incident angles, $\theta$, approaches about half the slanting angle, $\alpha$, of the slanting aperture 122(a)(2). The graph in FIG. 4 also includes a second curve 152 of the intensity of light transmitted through the slanting aperture 122(a)(2) in FIG. 3 versus the incident angle, $\theta$, of the incoming light. The magnified portion of the graph of the local area of the first curve 151 shows the non-zero (high) gradient of the intensity of light transmitted through the slanted aperture 122(a)(2) near an incident angle, angle, $\theta$, of zero (i.e., at normal incidence). Whereas, the second curve 152 of the intensity of light through the non-slanted aperture 122(b)(2) at an incident angle, angle, $\theta$, of zero (i.e., at normal incidence) is nearly flat and has a gradient of approximately zero.

Embodiments of the light-field pixel system 10, such as the embodiment shown in FIG. 3, include light-field pixels 100 that use a slanting aperture-based wavefront imaging technique. This technique uses an aperture layer 120 that can be directly incorporated onto a light detector layer 130 having an image sensor (e.g., a CMOS image sensor) to achieve full field quantitative wavefront (phase gradient) imaging. Compared with a conventional single aperture, such as one of the non-slanting apertures 122(b)(2) shown in FIG. 3, where the gradient of transmission versus incident angle is always close to zero at normal incidence, the higher gradient shown in FIG. 4 can be used for wavefront detection. In such a wavefront detection scheme, the non-slanting aperture 122(b) associated with the slanting aperture 122(a)(2) should be fabricated close to the slanting aperture 122(a)(2). As such, the intensity of incoming light does not dramatically change on these two apertures, and the wavefront information can be decomposed from the intensity information by the following steps: 1) get the intensity from the non-slanting hole 122(b)(2), 2) get the intensity from the slanting hole 122(a)(2), 3) normalize the intensity from the slanting hole 122(a)(2) by the value of the non-slanting hole 122(b)(2), and 4) map this normalized value to a pre-measured calibration curve to get the incident angle, $\theta$, of the incoming light.

A calibration curve of embodiments can refer to a curve of the normalized intensity versus incident angle, $\theta$, as measured experimentally at a light-field pixel 100. The calibration curve can be used to determine the incident angle, $\theta$, of the incoming light at the light-field pixel 100 based on the measured normalized intensity at the light-field pixel 100. The phase gradient of the incoming light can be determined from the determined incident angle, $\theta$. The phase gradient in two dimensions can be determined using calibration curves for two non-conventional apertures oriented in the aperture layer 120 to measure phase gradient in two dimensions.

Figure 5:
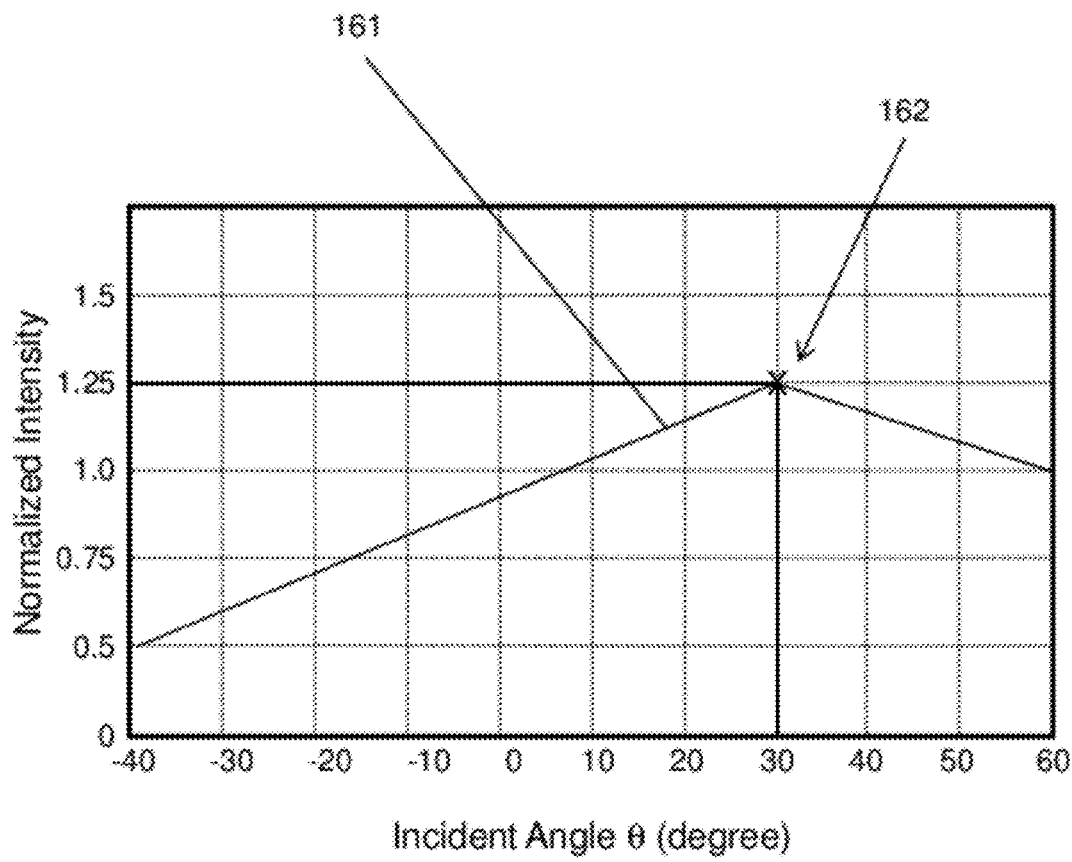
FIG. 5 is a graph of a calibration curve of a light-field pixel using the slanting-aperture based wavefront imaging technique, according to an embodiment of the invention.

FIG. 5 is a graph of a calibration curve 161 of a light-field pixel 100 using the slanting-aperture based wavefront imaging technique, according to an embodiment of the invention. The calibration curve 161 in FIG. 5 is the experimentally determined normalized intensity of light at various incident angles, $\theta$, through a second slanting aperture 122(a)(2) (as shown in FIG. 3) having a longitudinal axis 124(a)(2) at an angle, $\alpha_2$, of approximately 30 degrees from a x'-axis in the x-direction. In this embodiment, the normalized intensity is close to maximum at an incident angle, $\theta$, of about 15 degrees at about half the angle, $\alpha_2$, of the longitudinal axis 124(a)(2). The calibration curve 161 can be used to determine the incident angle, $\theta$, for a measured normalized intensity of the calibrated light-field pixel 100. For example, the light detecting element 132(3) associated with the second slanted aperture 122(a)(2) of a calibrated light-field pixel 100 may measure an intensity, $I_1$, the light detecting element 132(4)

associated with the second non-slanted aperture 122(b)(2) may measure an intensity of $I_4$, and the normalized intensity, $I_3/I_4$, may be 1.25. The normalized intensity, $I_3/I_4$, of 1.25 can be mapped to an incident angle, θ, at the light-field pixel 100 of 30 degrees on the calibration curve 161 in FIG. 5. A similar calibration curve 161 can be generated from experimental data for the first slanting aperture 122(a)(1).

Figure 6A:
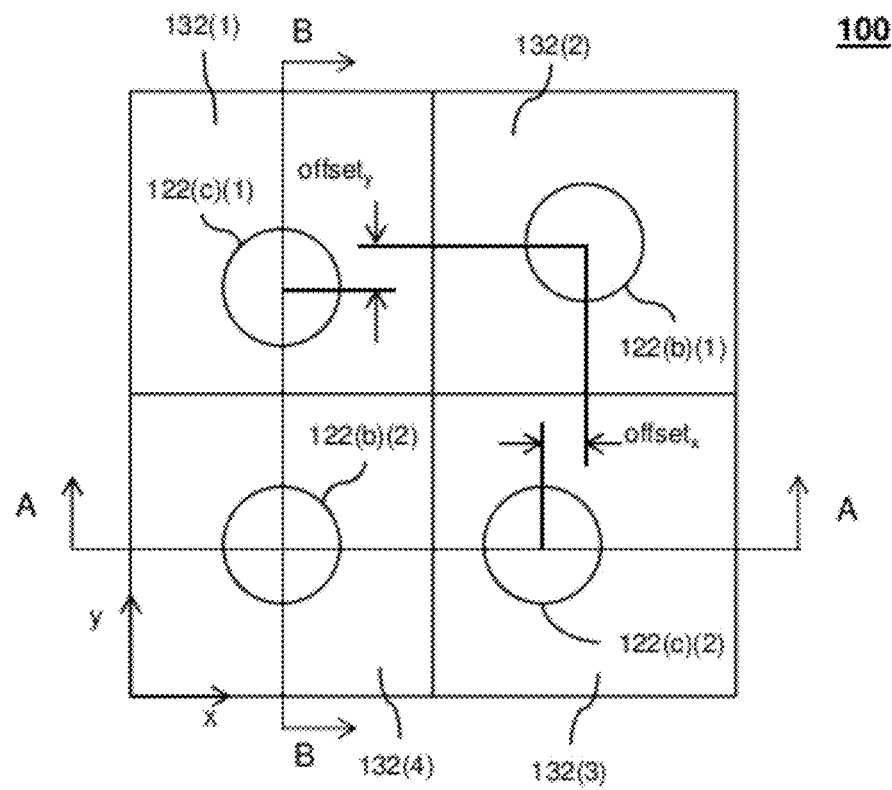
FIG. 6(a) is schematic drawing of a top view of a light-field pixel using the shifted-aperture based wavefront imaging technique, according to an embodiment of the invention.
Figure 6B:
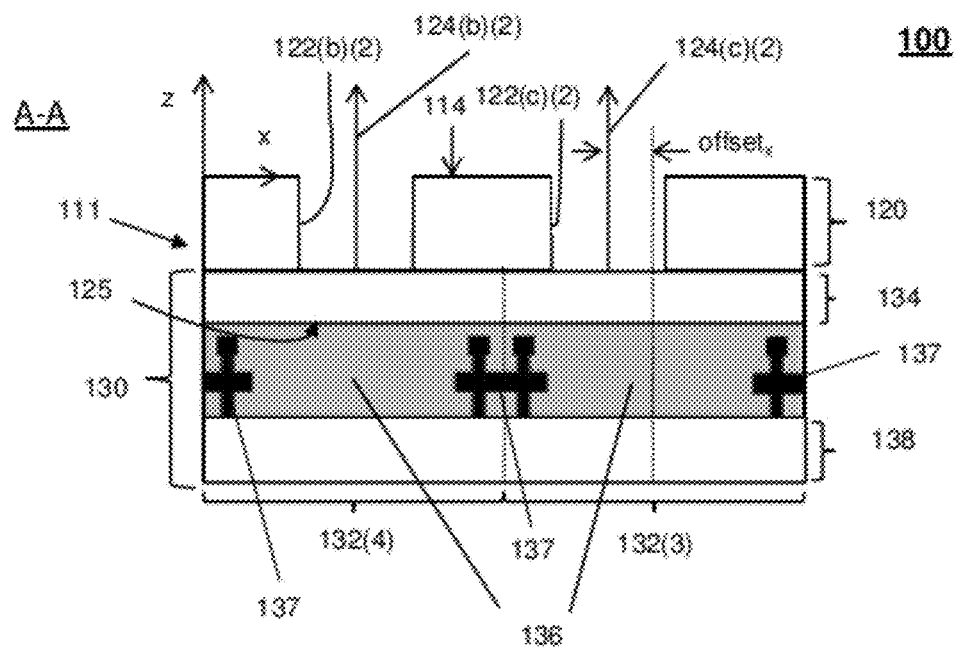
FIG. 6(b) is a schematic drawing of a cross section A-A of the light-field pixel of FIG. 6(a) showing some of the details of the light-field pixel, according to an embodiment of the invention.
Figure 6C:
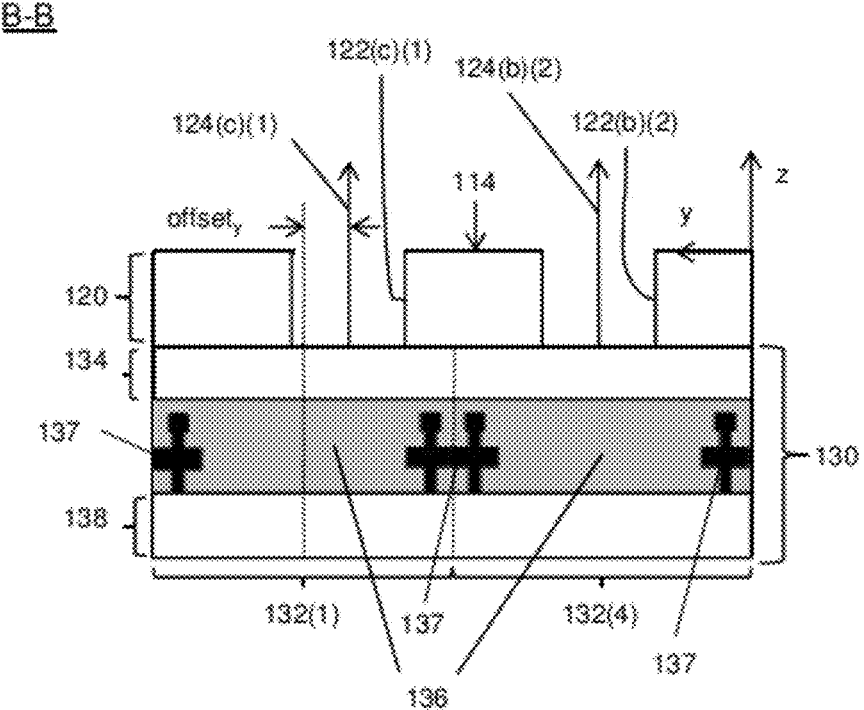
FIG. 6(c) is a schematic drawing of a cross section B-B of the light-field pixel of FIG. 6(a) showing some of the details of the light-field pixel, according to an embodiment of the invention.

FIG. 6(a) is schematic drawing of a top view of a light-field pixel 100 using the shifted-aperture based wavefront imaging technique, according to an embodiment of the invention. FIG. 6(b) is a schematic drawing of a cross section A-A of the light-field pixel 100 of FIG. 6(a) showing some of the details of the light-field pixel 100, according to an embodiment of the invention. FIG. 6(c) is a schematic drawing of a cross section B-B of the light-field pixel 100 of FIG. 6(a) showing some of the details of the light-field pixel 100, according to an embodiment of the invention. In the illustrated example, the light-field pixel 100 includes a multi-layered body 111 comprising an aperture layer 120 having the outer surface 114 and an inner surface 125, and a light detector layer 130 to the inside of the aperture layer 120. The light detector layer 130 includes a 2×2 grid of four light detecting element elements 132 (e.g., image sensor pixels) in the light detector layer 130. The four light detecting elements 132 include a first light detecting element 132(1), a second light detecting element 132(2), a third light detecting element 132(3), and a fourth light detecting element 132(4). The light-field pixel 100 also includes an x-axis, a y-axis, and a z-axis. The x-axis and y-axis lie in the plane at the outer surface 114. The z-axis is orthogonal to the plane at the outer surface 114.

In FIGS. 6(a), 6(b), and 6(c), the aperture layer 120 includes two non-conventional apertures: a first shifted aperture 122(c)(1) having a longitudinal axis 124(c)(1) and a second shifted aperture 122(c)(2) having a longitudinal axis 124(c)(2). The aperture layer 120 also includes two conventional apertures: a first non-shifted aperture 122(b)(1) having a longitudinal axis 124(b)(1) and a second non-shifted aperture 122(b)(2) having a longitudinal axis 124(b)(2).

A shifted aperture 122(c) of embodiments can refer to an aperture that has a longitudinal axis 124(b) normal to the outer surface 114 and is shifted by an offset (i.e. off-center) from the centerline of the corresponding light detecting element(s) 132. An offset can refer to the distance between the centerline of a corresponding light detecting element 132 and the longitudinal axis 124(b) of the shifted aperture 122(c). In many cases, only the center portion (e.g., 40% of the surface area) of the photosensitive layer 138 of each light detecting element 132 is effective. By shifting the aperture by an offset, the projection of light at normal incidence is moved from the highly sensitive center portion of the corresponding light detecting element 132 to a less sensitive portion. Due to the offset, the shifted aperture 122(c) has a non-zero gradient of transmission at normal incidence. At the same time, the intensity increases when the incoming light is at an incident angle that projects the light onto the center of the light detecting element 132. The offset, can be any suitable value. An example of a suitable value for the offset is about 30% of the size of the light detecting element 132 (i.e., pixel size).

In FIGS. 6(a), 6(b), and 6(c), the first shifted aperture 122(c)(1) has a longitudinal axis 124(c)(1) that is located at a first offset$_y$ along the y-direction from the centerline of the associated first light detecting element 132(1). The second shifted aperture 122(c)(2) has a longitudinal axis 124(c)(2) that is located at a second offset$_x$ along the x-direction from the centerline of the associated first light detecting element 132(1). In other embodiments, the first and second shifted apertures 122(c)(1) and 122(c)(2) may be offset from the center by first and second offsets measured with respect to another set of orthogonal directions.

A non-shifted aperture 122(b) of embodiments can refer to a conventional aperture that has a longitudinal axis 124(b) that is normal to the plane at the outer surface 114. Generally, the non-shifted aperture 122(b) of embodiments is located and centered about the center of a single corresponding light detecting element 132. The non-shifted aperture 122(b) and its corresponding light detecting element 132 are associated with one or more shifted apertures 122(c) and their corresponding light detecting elements 132 for wavefront detection purposes. That is, the measured local intensity of light through the non-shifted aperture 122(b) may be used to normalize the measured local intensity of light through the associated shifted aperture 122(c). The non-shifted aperture 122(b) can be fabricated close the associated shifted aperture 122(c) so that the intensity of incoming light does not dramatically change between the non-shifted aperture 122(b) and the associated shifted aperture 122(c).

In FIGS. 6(a), 6(b), and 6(c), the first non-shifted aperture 122(b)(1) has a longitudinal axis 124(b)(1) normal to a plane at the outer surface 114 and the second non-shifted aperture 122(b)(2) has a longitudinal axis 124(a)(2) normal to a plane at the outer surface 114. The first and second non-shifted apertures 122(b)(1) and 122(b)(2) are centered above associated light detecting elements 132(2) and 132(4) respectively. The first non-shifted aperture 122(b)(1) and its corresponding second light detecting element 132(2) are associated with the first shifted aperture 122(c)(1) and its corresponding first light detecting element 132(2) for normalizing the intensity of light through the first shifted aperture 122(c)(1). The second non-shifted aperture 122(b)(2) and its corresponding fourth light detecting element 132(4) are associated with the second shifted aperture 122(c)(2) and its corresponding third light detecting element 132(3) for normalizing the intensity of light through the second shifted aperture 122(c)(2).

The light detector layer 130 shown in FIGS. 6(b) and 6(c) is a multi-layered structure of an image sensor comprised of a transparent layer 134 (e.g., a Polymethyl methacrylate (PMMA) layer), a dielectric stack layer 136 having interconnections 137, and a photosensitive layer 138 (e.g., silicon substrate layer). The interconnections 137 connect the dielectric stack layers 136 of adjacent light detecting elements 132.

The four apertures 122(x)(1), 122(b)(1), 122(x)(2), and 122(b)(2) uniquely correspond to the four light detecting elements 132(1), 132(2), 132(3), and 132(4) respectively. The first light detecting element 132(1) measures a first intensity of light, $I_1$, through the first shifted aperture 122(c)(1). The second light detecting element 132(2) measures a second intensity of light, $I_2$, through the first non-shifted aperture 122(b)(1). The third light detecting element 132(3) measures a third intensity, $I_3$, of light through the second shifted aperture 122(c)(2). The fourth light detecting element 132(4) measures a fourth intensity, $I_4$, of light through the second non-shifted aperture 122(b)(2). Although the light-field pixel 100 of embodiments include a 2×2 grid of four aperture-light detecting element pairs in a certain order/arrangement, other embodiments may include other suitable number of pairs and arrangements. Also, in other embodiments a plurality of light detecting elements 132 may be associated with each aperture 122.

In embodiments using the shifted-aperture based wavefront imaging technique, a first normalized intensity can refer to the intensity of light through the second shifted aperture 122(c)(2) as normalized by the intensity of light through either the first non-shifted aperture 122(b)(1) or the second non-shifted aperture 122(b)(2). This normalized intensity may be related to the phase gradient in the y-direction. The second normalized intensity can refer to the intensity of light through the first shifted aperture 122(c)(1) as normalized by the intensity of light through either the first non-shifted aperture 122(b)(1) or the second non-shifted aperture 122(b)(2). The first normalized intensity may be related to the incident angle in the x-z plane and the phase gradient in the x-direction. The second normalized intensity may be related to the incident angle in the y-z plane and the phase gradient in the y-direction.

Figure 7:
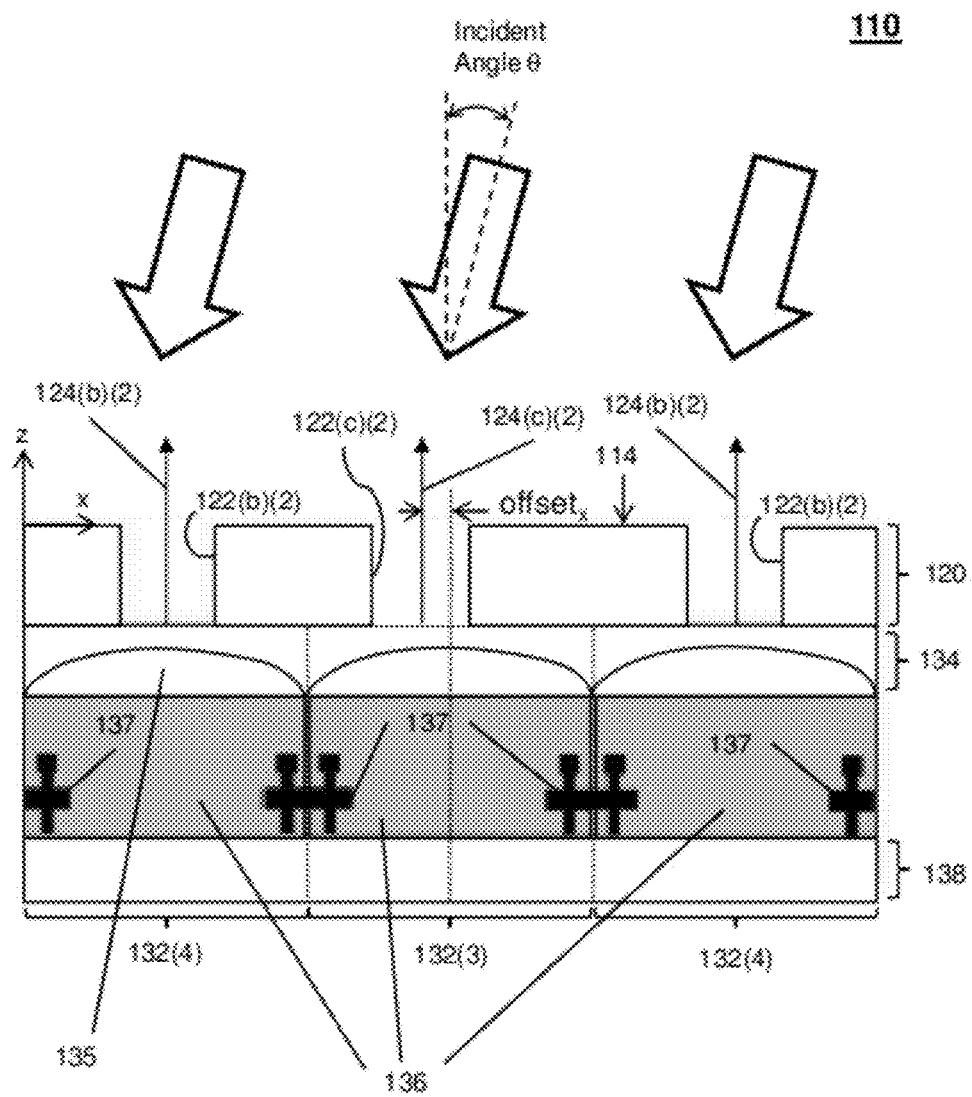
FIG. 7 is a schematic drawing of a cross sectional view at an x-z plane through the center of portions of two light-field pixels in an array of light-field pixels using the shifted-aperture based wavefront imaging technique, according to an embodiment of the invention.

FIG. 7 is a schematic drawing of a cross sectional view at an x-z plane through the center of portions of two light-field pixels 100 in an array of light-field pixels 110 using the shifted-aperture based wavefront imaging technique, according to an embodiment of the invention. The cross section shown in the illustrated example lies through the center of a second shifted aperture 122(b)(2) and the center of the second non-shifted aperture 122(b)(2). The portions of light-pixels 100 include a multi-layered body 111 having an aperture layer 120 with an outer surface 114 and a light detector layer 130 to the inside of the aperture layer 120. The light-field pixel 100 also includes an x-axis, a y-axis (not shown), and a z-axis. The x-axis and y-axis lie in a plane at the outer surface 114. The z-axis is orthogonal to the plane at the outer surface 114. In FIG. 7, an image wavefront impinges the aperture layer 120 at an incident angle, θ.

In FIG. 7, the aperture layer 120 includes a shifted aperture 122(c)(2) and two non-shifted apertures 122(b)(2). The shifted aperture 122(c)(2) has a longitudinal axis 124(c)(2) in an x-z plane and that is offset$_x$ along the x-direction from the centerline of the associated first light detecting element 132(1). The two non-shifted apertures 122(b) have a longitudinal axes 124(b) normal to the outer surface 114.

The light detector layer 130 in FIG. 7 includes a transparent layer 134 having three optional microlenses 135, a dielectric stack layer 136 having interconnections 137, and a photosensitive layer 138. The cross section shown in FIG. 7 lies through three light detecting elements 132 of two light-field pixels 100. The three light detecting elements 132 include a third light detecting element 132(3) associated with the second shifted aperture 122(c)(2) and two fourth light detecting elements 132(4) associated with second non-shifted apertures 122(b)(2) and two light-field pixels 100.

Embodiments of the light-field pixel system 10, such as the embodiment shown in FIG. 7, include light-field pixels 100 that use a shifted aperture-based wavefront imaging technique. This technique involves shifting an aperture rather than slanting an aperture as described in the slanted aperture-based wavefront imaging technique. The shifted aperture-based wavefront imaging technique can be an even simpler technique to detect wavefront information than the slanted aperture-based wavefront imaging technique. Since there is small displacement of the aperture center and the photosensitive area, there is a non-zero phase gradient response at normal incidence. Similar to the slanting aperture-based wavefront imaging/detection scheme discussed above, the wavefront information can be decomposed from the intensity information by the following steps: 1) get the intensity from the non-shifted hole 122(b), 2) get the intensity from the associated shifted hole 122(c), 3) normalize the intensity from the slanting hole 122(c) by the value of the non-shifted hole 122(b), and 4) map this normalized value to a pre-measured calibration curve to get the incident angle, θ, of the incoming light.

Calibration curves 161, similar to the one shown in FIG. 5, can be generated for the first shifted aperture 122(c)(1) and second shifted aperture 122(c)(2) using experimentally measured intensity data of light transmitted through the apertures at various incident angles, θ. In many cases, the calibration curves will be the same for the first and second shifted apertures 122(c)(1) and 122(c)(2). The intensity at the orthogonally offset shifted apertures 122(c)(1) and 122(c)(2) can be normalized by the intensity measured through one or both of the conventional apertures 122(b)(1) or 122(b)(2). The calibration curves 161 can be used to determine the incident angles, θ, in the x-direction and y-direction of an impinging wavefront 310 at the calibrated light-field pixel 100 based on the normalized intensity measured through the orthogonally offset shifted apertures 122(c)(1) and 122(c)(2).

A light-field pixel 100 of embodiments can include any suitable number (e.g., 1, 2, etc.) of non-conventional (e.g., slanting, shifted, etc.) apertures and any suitable number e.g., 1, 2, etc.) of conventional (e.g., non-slanting, non-shifted, etc.) apertures 122. In an exemplary embodiment of a light-field pixel 100 using the slanting-aperture based wavefront imaging technique, the light-field pixel 100 includes two slanting apertures 122(a)(1) and 122(a)(2) and two non-slanting apertures 122(b)(1) and 122(b)(2). In an exemplary embodiments of a light-field pixel 100 using the shifted-aperture based wavefront imaging technique, the light-field pixel 100 includes two shifted apertures 122(a)(1) and 122(a)(2) and two non-shifted apertures 122(b)(1) and 122(b)(2). Although the illustrated embodiments show a certain arrangement and number of apertures in the aperture layer 120, other embodiments may include other arrangements and other numbers of apertures 122. For example, a light-field pixel may have the first slanting aperture 122(a)(1) over a light detecting element 132(4) and the second slanting aperture 122(a)(2) over light detecting element 132(1) and the non-slanting apertures 122(b)(1) over light detecting element 132(2) and non-slanting aperture 122(b)(2) over light detecting element 132(3). As another example, a light field pixel 100 may have the first slanting aperture 122(a)(1) over a light detecting element 132(1), the second slanting aperture 122(a)(2) over light detecting element 132(3), and a single non-slanting apertures 122(b)(1) over light detecting element 132(4).

Returning to FIG. 1, an illumination source 200 can refer to any suitable device or other source of illumination 210. Illumination 210 provided by illumination source 200 can be of any suitable wavelength and intensity. Also, the illumination 210 can include polarized and/or unpolarized light. Suitable illumination sources 200 are naturally and commercially available. The illumination source 200 can be a component of the light-field pixel system 10 in some cases and can be a separate component in other cases.

The illumination source 200 can be placed in any suitable location and positioned at any suitable angle to provide appropriate illumination 210 to the light-field pixel system 10. In some embodiments, multiple illumination sources 200 may provide illumination 210 in one or more directions. For example, a camera system employing a light-field pixel system 10 of an embodiment can have a first illumination source 200 that provides illumination 210 in a first direction such as from a flash and a second illumination source 200 that provides illumination 210 in a second direction. The first direction can be different from second direction, similar to the second direction, or the same as the second direction. In other embodiments, a single illumination source 200 provides illumination 210 in a single direction. For example, a microscope system comprising a light-field pixel system 10 may have a single illumination source 200 positioned to provide illumination 210 in the negative z-direction.

Any suitable type of object 300 may be examined or imaged by the light-field pixel system 10. Suitable types of objects 300 can be biological or inorganic entities. Examples of biological entities include whole cells, cell components, microorganisms such as bacteria or viruses, cell components such as proteins, etc. Although a single object 300 is shown in illustrated embodiments, any suitable number (e.g., 1, 2, 10, 100, 1000, etc.) or portion(s) of objects 152 may be examined or imaged by the light-field pixel system 10.

The light-field pixel system 10 of embodiments of the invention may also include processing components such as components used in image processing. In FIG. 1, the light-field pixel system 10 includes a host computer 400 in communication with the array of light field pixels 110. In other embodiments, the host computer 400 can be a separate device from the light-field pixel system 10. In FIG. 1, the host computer 400 includes a processor 410 (e.g., a microprocessor) communicatively coupled to a computer readable medium 420 (CRM). Although the processor 410 and CRM 420 are shown as components of the light-field pixel system 10, in other embodiments the processor 410 and CRM 420 may be components of the array of light-field pixels 110, or can be separate components from the light-field pixel system 10. In FIG. 1, the processor 410 (e.g., a microprocessor) is also communicatively coupled to a display 430 to provide information such as image data associated with the object 300 to a user of the light-field pixel system 10.

The processor 410 may be integrated in or separate from the light detector layer 130. The processor 410 receives signals with light data from the light detecting elements 132 of the light detector layer 130 associated with the light received by the light detecting elements 132. The light data may include the intensity of the light, the wavelength(s) of the light, and/or other information about the light received by the light detecting elements 132. The processor 410 executes code for performing some of the functions of the light-field pixel system 10.

The CRM (e.g., memory) 420 can store the code for performing the functions of the light-field pixel system 10. The code is executable by the processor 410. In one embodiment, the CRM 420 comprises: a) code for calibrating the array of light-field pixels 110 to determine the calibrations curves of normalized intensity versus incident angle, b) code for normalizing the intensity of light in two orthogonal directions measured through the non-conventional apertures using the measured intensity of light through the conventional aperture(s), c) code for determining two-dimensional phase gradient variations based on the normalized intensities in two orthogonal directions, d) code for determining amplitude variations based on the intensities measured by the apertures, e) code for generating image data of the object 300 based on intensity and/or phase gradient variations, f) code for determining phase gradient in a particular direction, g) code for displaying the image on the display 430, and h) any other suitable code for image processing or other processing functions of the light-field pixel system 10. The CRM 420 may also include code for performing any of the signal processing or other software-related functions that may be created by those of ordinary skill in the art. The code may be in any suitable programming language including C, C++, Pascal, etc.

The light-field pixel system 10 also includes a display 430 communicatively to the processor 410 to receive image data and provide output such as images to a user of the SPLM system 10. Suitable displays 430 are commercially available. Any suitable type of display 430 may be used. For example, the display 430 may be a color display or a black and white display. In addition, the image display 230 may be a two-dimensional display or a three-dimensional display.

The light-field pixel system 10 of embodiments can determine two-dimensional phase gradient information. Two-dimensional phase gradient information can refer to phase gradient information in two orthogonal directions (e.g., the x-direction and y-direction). The light-field pixel system 10 can use the two-dimensional phase gradient information to generate one or more wavefront images such as the two orthogonal normalized $\theta_x$ and $\theta_y$ images or other phase gradient images that may be more amenable to the user's needs. In addition, the light-field pixel system 10 can also use the two-dimensional phase gradient information (or portion thereof) in two orthogonal directions along with the amplitude information to reconstruct a combined wavefront image.

The light-field pixel system 10 of embodiments can back propagate the detected wavefront image of an object 300 along any direction $\vec{n}$ to a given plane. The light-field pixel system 10 can determine the wavefront image of the object 300 along any direction $\vec{n}$ by simply taking the inner product of the unit direction vector $\vec{n}$ and the spatial phase-gradient-vector $\vec{\theta} = \theta_x \vec{i} + \theta_y \vec{i}$. For example, the light-field pixel system 10 can detect wavefront information at the plane of the outer surface 114 and propagate the wavefront information to parallel planes through the object 300 to generate a two dimensional images of the object 300 at the parallel planes. In a conventional DIC microscope, this can only be done by imaging at another orientation. By back propagation of the wavefront image, the light-field pixel system 10 can generate a two-dimensional wavefront image at a given plane and can also generate a three-dimensional wavefront image by combining two-dimensional wavefront images at multiple planes.

Embodiments of the light-field pixel system 10 can be used in applications such as microscopy, photography, or other imaging devices. Since the slanting/shifted and non-slanting/non-shifted apertures of embodiments can be fabricated on top of the light detecting elements 132 (e.g., CCD or CMOS sensor pixels), the wavefront detection process can be done on a conventional sensor chip with a high spatial sampling rate (at least two order of magnitude larger than the microlenses array used in a conventional Shack-Hartmann wavefront sensor). For example, an embodiment of a light-field pixel system 10 can be on a chip that can be implemented into a standard bright-field microscope to transform it into a wavefront microscope that can provide both bright-field and wavefront images. The ability to capture the intensity and wavefront information at the same time can also find some application in a plenoptic camera, which uses a microlenses array to capture 4D light field information. Embodiments of the light-field pixel system 10 provide a simple and high performance wavefront sensing device that can also have significant applications in facial recognition, fingerprint analysis and machine image interpretation. In addition, fields such as LASIK surgery and high-resolution retinal imaging can also benefit from the phase gradient measuring capability of the light-field pixel system 10.

Modifications, additions, or omissions may be made to the light-field pixel 100 and/or light-field pixel system 10 without departing from the scope of the disclosure. The components of light-field pixel 100 and/or light-field pixel system 10 may be integrated or separated according to particular needs. For example, the processor 410 may be a component of the light detector layer 130. As another example, the light-field pixel 100 may optionally include a transparent protective layer (not shown) that covers the opaque or semi-opaque aperture layer 120 to isolate the opaque or semi-opaque aperture layer 120. Moreover, the operations of the light-field pixel 100 and/or light-field pixel system 10 can be performed by more, fewer, or other components. Additionally, operations of the light-field pixel 100 and/or light-field pixel system 10 may be performed using any suitable logic comprising software, hardware, other logic, or any suitable combination of the preceding.

II. Methods of Making a Light-Field Pixel or an Array of Light Field Pixels

Figure 8:
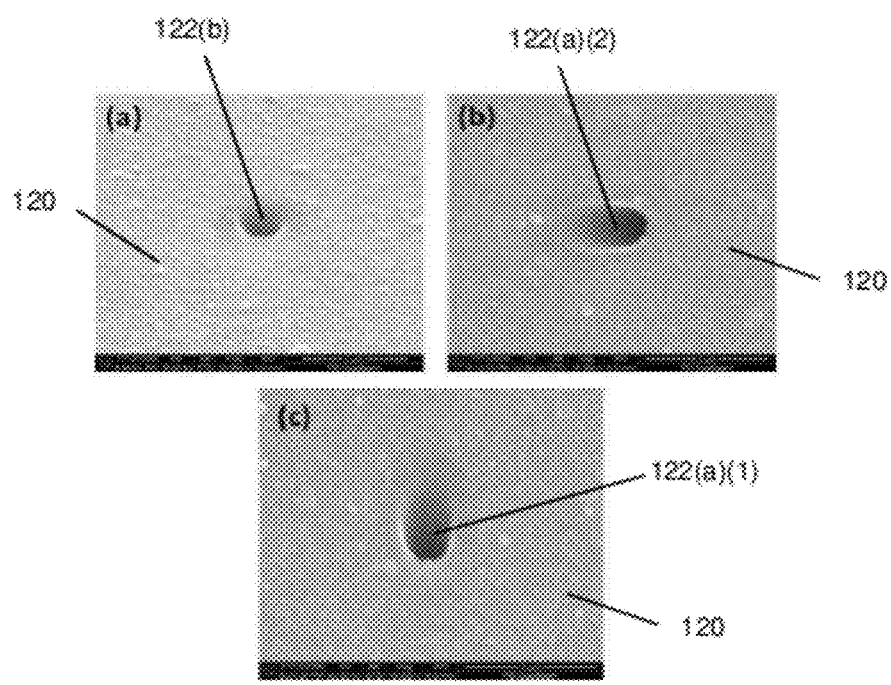
FIG. 8(a) is a scanning electron microscope (SEM) image of a non-slanting aperture, according to an embodiment of the invention.
FIG. 8(b) is a SEM image of a second slanting aperture, according to an embodiment of the invention.
FIG. 8(c) is a SEM image of a first slanting aperture, according to an embodiment of the invention.

The components of the light-field pixel 100 of embodiments can be fabricated using well-known processes such as milling, etching, lamination, and soft lithography. FIGS. 8(a), 8(b), and 8(c) are SEM images of a non-slanting aperture 122(b) (either a first non-slanting aperture 122(b)(1) or a second non-slanting aperture 122(b)(2)), a first slanting aperture 122(a)(1) and a second slanting aperture 122(a)(2) in a 1 micron thick aluminum m metal aperture layer 120, according to an embodiment of the invention. In this embodiment, the non-slanting aperture 122(b), the first slanting aperture 122(a)(1), and the second slanting aperture 122(a)(2) were milled by a focus ion beam system. A similar process can be used to fabricate a non-shifted aperture 122(b) (either a first non-shifted aperture 122(b)(1) or a second non-shifted aperture 122(b)(2)), a first shifted aperture 122(c)(1) and a second shifted aperture 122(c)(2) in a metal aperture layer 120 of a light-field pixel 100 of embodiments. In FIGS. 8(a), 8(b), and 8(c), the optical characterizations of the apertures are ongoing. That is, the intensity versus incident angle may be measured to see if it is in good agreement with simulation. In one exemplary process, a layer of material (e.g., thin metallic layer) is coated with a sacrificial layer. The apertures are defined on the sacrificial layer using lithography. The sample is tilted at an angle, α, and an anisotropic etching method is used to etch the slanting aperture 122(a).

In FIGS. 8(a), 8(b), and 8(c), the non-slanting aperture 122(b), the first slanting aperture 122(a)(1), and the second slanting aperture 122(a)(2) have been fabricated directly on top of the light detecting elements 132. Since the slanting/shifted and non-slanting/non-shifted apertures of embodiments can be fabricated on top of the light detecting elements 132 (e.g., CCD or CMOS sensor pixels), the whole wavefront detection process can be done on a conventional sensor chip with a high spatial sampling rate (at least two order of magnitude larger than the microlenses array used in a conventional Shack-Hartmann wavefront sensor). The ability to capture the intensity and wavefront information at the same time can also find some application in plenoptic camera, which uses a microlenses array to capture 4D light field information. A simple and high performance wavefront sensor can have significant applications in facial recognition, fingerprint analysis and machine image interpretation.

III. Methods of Wavefront Detection/Imaging

Figure 9:
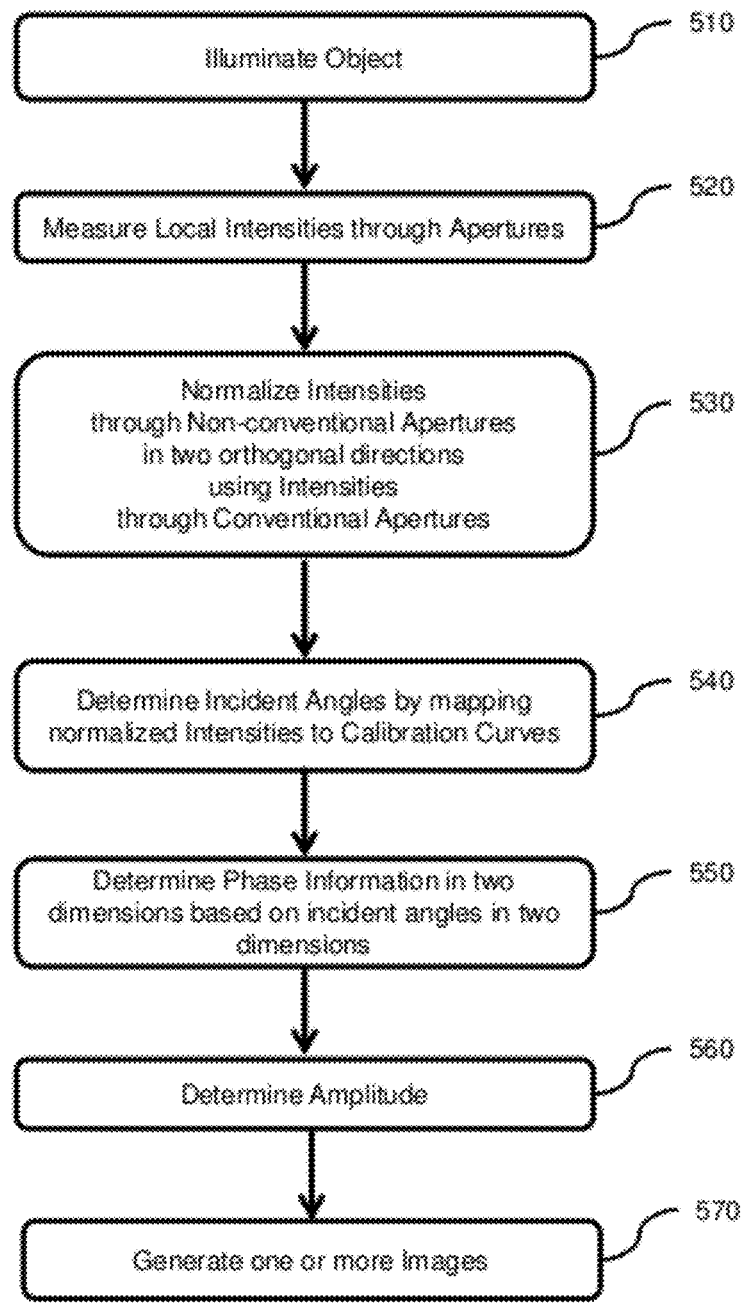
FIG. 9 is a flowchart of a method of using a light-field pixel system 10 having an array of light-field pixels to detect wavefront information and generate one or more wavefront images, according to embodiments of the invention.

FIG. 9 is a flowchart of a method of using a light-field pixel system 10 having an array of light-field pixels 110 to detect wavefront information and generate one or more wavefront images, according to embodiments of the invention. The light-field pixel system 10 has an array of light-field pixels 110. Each light-field pixel has an aperture array 120 and a light detector layer 130. In embodiments, the array of light-field pixels 110 includes uniformly designed light-field pixels 100, each light-field pixel 100 having two non-conventional (e.g., slanting or shifted) apertures in two orthogonal directions and two conventional apertures. The light detector layer has light detecting elements 132. Each aperture in the array of light-field pixels 110 maps to a single light detecting element 132.

To calibrate the array of light-field pixels 110, uniform light of different incident angles, θ, may be used to illuminate the array of light-field pixels 110 at different times. The measured response of each of the light detecting elements 132 beneath each of the apertures 122 may be taken. For each incident angle, θ, the local intensity measured at the non-conventional apertures may be normalized by the local intensity measured at one or more of the conventional apertures in the light-field pixel 100. Calibration curves 161 are generated based on the normalized intensity at each incident angle, θ. In many cases, the calibration curves 161 for the different light-field pixels 100 will show the same response in cases where the light-field pixels 100 share the same design. In these cases, a single calibration curve 161 can be used for every light-field pixel 110 in each of the orthogonal directions.

After calibration, an object 300 being examined by the light-field pixel system 10 can be introduced. At step 510, the method starts by illuminating the object 300 being examined using an illumination source 200. Any illumination source 200 generating appropriate illumination 210 can be used. The object 300 modulates the illumination 210 from the illumination source 200 inducing an image wavefront 310. For example, referring to FIG. 1, a light-field pixel system 10 is shown with an image wavefront induced by an object 300.

Light passing through the apertures 122 in light-field pixels 100 can be received by corresponding light detecting elements 132 as light projections. In a first example, referring to FIGS. 2(a), 2(b), and 2(c), the first light detecting element 132(1) is assigned to the first slanting aperture 122(a)(1), the second light detecting element 132(2) is assigned to the first non-slanting aperture 122(b)(1), the third light detecting element 132(3) is assigned to the second slanting aperture 122(a)(2), the fourth light detecting element 132(4) is assigned to the second non-slanting aperture 122(b)(2). In a second example, referring to FIGS. 6(a), 6(b), and 6(c), the first light detecting element 132(1) is assigned to the first shifted aperture 122(c)(1), the second light detecting element 132(2) is assigned to the first non-shifted aperture 122(b)(1), the third light detecting element 132(3) is assigned to the second shifted aperture 122(c)(2), the fourth light detecting element 132(4) is assigned to the second non-shifted aperture 122(b)(2). The first slanting aperture 122(a)(1) is oriented in the y-direction by having a longitudinal axis 124(a)(1) at an angle $\alpha_1$ from a local axis in the y-direction. The second slanting aperture 122(a)(1) is oriented in the x-direction by having a longitudinal axis 124(a)(1) at an angle $\alpha_2$ from a local axis in the x-direction. The first shifted aperture 122(c)(1) is oriented in the y-direction by having an offset$_y$ the y-direction. The second shifted aperture 122(c)(1) is oriented in the x-direction by having an offset$_x$ the x-direction.

At step 520, each light detecting element 132 can measure a local intensity of the received light transmitted through the corresponding aperture 122. A processor 410 receives a signal or signals with data having the local intensity associated with each aperture 122. The processor 410 may be a component of the array of light-field pixels 110 or may be a separate component. Referring back to the first example, the first light detecting element 132(1) may measure a first intensity $I_1$ of light through the first slanting aperture 122(a)(1), the second light detecting element 132(2) may measure a second intensity $I_2$ of light through the first non-slanting aperture 122(b)(1), the third light detecting element 132(3) may measure a third intensity $I_3$ of light through the second slanting aperture 122(a)(2), and the fourth light detecting element 132(4) may measure a fourth intensity $I_4$ of light through the second non-slanting aperture 122(b)(2).

At step 530, the processor 410 can normalize the local intensities of light through the non-conventional apertures in two orthogonal directions with the local intensity of light through one of the conventional apertures. In the example above, in reference to FIG. 2(b), the processor 410 may normalize the first intensity $I_1$ using the second intensity $I_2$ or the fourth intensity $I_4$, and may normalize the third intensity $I_1$ using the second intensity $I_2$ or the fourth intensity $I_4$. The normalized intensity through the first slanting aperture 122 (a)(1) may be $I_1/I_2$ or $I_1/I_4$. The normalized intensity through the second slanting aperture 122(a)(2) may be $I_3/I_2$ or $I_3/I_4$. The normalized intensity through the first slanting aperture 122(a)(1) is associated with the y-direction and the normalized intensity through the second slanting aperture 122(a)(2) is associated with the x-direction.

At step 540, the processor 410 can determine the incident angles in two dimensions by mapping the normalized intensities through the non-conventional apertures in orthogonal directions to the calibration curves. Referring again to the above example, the normalized intensity of $I_1/I_2$ or $I_1/I_4$ can be mapped to a first incident angle on a calibration curve and the normalized intensity of $I_3/I_2$ or $I_3/I_4$ can be mapped to a second incident angle on a calibration curve. An example of a calibration curve 161 is shown in FIG. 5.

At step 550, the processor 410 can determine the phase gradient in two orthogonal directions at each light field pixel 100 location (x,y) based on incident angles determined from normalized intensities associated with non-conventional apertures in orthogonal directions. In the above example, the processor 410 can determine a phase gradient in the x-direction and y-direction at each light-field pixel 100 location (x,y) based on the first and second incident angles.

At step 560, the processor 410 can also determine the amplitude of the wavefront at each light-field pixel 100 location (x,y). For each light-field pixel 100, the processor 410 sums up the local intensity values measured by the light detecting elements 132 associated with the apertures 122 of the light-field pixel 100. For example, the processor 410 may sum up the values from the 2×2 grid of light detecting elements 132(1), 132(2), 132(3), and 132(4) of the light-field pixel shown in FIGS. 2(a), 2(b), and 2(c).

At step 570, the processor 410 can generate one or more images of the object 300 based on the determined amplitude and/or phase gradient in two directions (step 414). For example, an intensity/amplitude image can be generated based on the amplitude information. As another example, a wavefront image based on the phase gradient in the x-direction or y-direction can be generated. As another example, an image based on the amplitude and phase gradient information in two orthogonal directions can be generated. As another example, the wavefront information may be propagated to a plane through the object 300 and used to generate a two-dimensional cross-sectional wavefront image at the plane. In another example, multiple two-dimensional cross-sectional wavefront images at multiple planes through the object 300 can be combined to generate a three-dimensional wavefront image.

Modifications, additions, or omissions may be made to any of the above described methods without departing from the scope of the disclosure. Any of the methods described above may include more, fewer, or other steps. For example, step 580 may be omitted in one embodiment. Additionally, steps may be performed in any suitable order without departing from the scope of the disclosure.

IV. Subsystems

Figure 10:
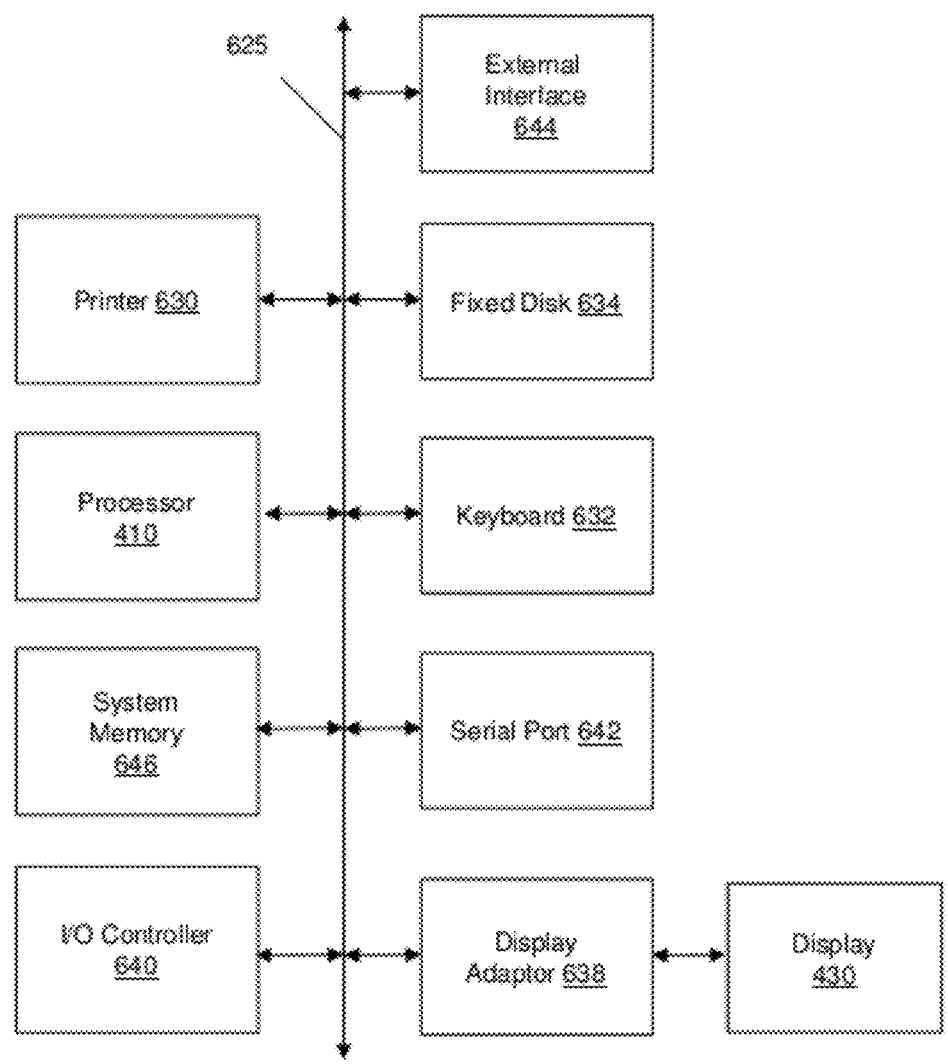
FIG. 10 is a block diagram of subsystems that may be present in the light-field pixel system, according to embodiments of the invention. For example, the light-field pixel system includes a processor.

FIG. 10 is a block diagram of subsystems that may be present in the light-field pixel system 10, according to embodiments of the invention. For example, the light-field pixel system 10 includes a processor 410. The processor 410 may be a component of the light detecting elements 132 in some cases.

The various components previously described in the Figures may operate using one or more of the subsystems to facilitate the functions described herein. Any of the components in the Figures may use any suitable number of subsystems to facilitate the functions described herein. Examples of such subsystems and/or components are shown in a FIG. 10. The subsystems shown in FIG. 10 are interconnected via a system bus 625. Additional subsystems such as a printer 630, keyboard 632, fixed disk 634 (or other memory comprising computer readable media), display 430, which is coupled to display adapter 638, and others are shown. Peripherals and input/output (I/O) devices, which couple to I/O controller 640, can be connected to the computer system by any number of means known in the art, such as serial port 642. For example, serial port 642 or external interface 644 can be used to connect the computer apparatus to a wide area network such as the Internet, a mouse input device, or a scanner. The interconnection via system bus allows the processor 410 to communicate with each subsystem and to control the execution of instructions from system memory 646 or the fixed disk 634, as well as the exchange of information between subsystems. The system memory 646 and/or the fixed disk 634 may embody a CRM 420. Any of these elements may be present in the previously described features.

In some embodiments, an output device such as the printer 630 or display 430 of the light-field pixel system 10 can output various forms of data. For example, the light-field pixel system 10 can output color/monochromatic two-dimensional or three-dimensional images, data associated with these images, or other data associated with analyses performed by the light-field pixel system 10.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a CRM, such as a random access memory (RAM), a read only memory (ROM), a magnetic medium such as a hard-drive or a floppy disk, or an optical medium such as a CD-ROM. Any such CRM may reside on or within a single computational apparatus, and may be present on or within different computational apparatuses within a system or network.

A recitation of "a", "an" or "the" is intended to mean "one or more" unless specifically indicated to the contrary.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

One or more features from any embodiment may be combined with one or more features of any other embodiment without departing from the scope of the disclosure. Further, modifications, additions, or omissions may be made to any embodiment without departing from the scope of the disclosure. The components of any embodiment may be integrated or separated according to particular needs without departing from the scope of the disclosure.

All patents, patent applications, publications, and descriptions mentioned above are hereby incorporated by reference in their entirety for all purposes. None is admitted to be prior art.

What is claimed is:

1. A light-field pixel for detecting a wavefront comprising:
   an aperture layer having an outer surface, a conventional aperture and a non-conventional aperture, the non-conventional aperture having a higher gradient of transmission at normal incidence than the conventional aperture; and
   a light detector layer configured to measure a first intensity of light through the non-conventional aperture and a second intensity of light through the conventional aperture; and
   a processor configured to detect the wavefront based on the first intensity normalized by the second intensity.

2. The light-field pixel of claim 1, wherein the conventional aperture has an approximately zero gradient of transmission at normal incidence.

3. The light-field pixel of claim 1, wherein the non-conventional aperture has a longitudinal axis oriented at an angle through the aperture layer.

4. The light-field pixel of claim 1, wherein the non-conventional aperture is located off-center from a corresponding light detecting element in the light detector layer.

5. The light-field pixel of claim 1, wherein the light detector layer includes the processor.

6. The light-field pixel of claim 1, wherein the processor is configured to detect the wavefront using a calibration curve to map the normalized intensity to an incident angle associated with a phase gradient.

7. The light-field pixel of claim 1, wherein the phase gradient is associated with a direction in a plane at the outer surface.

8. The light-field pixel of claim 7, wherein the direction is an x-direction.

9. The light-field pixel of claim 7, wherein the direction is a y-direction.

10. A light-field pixel system comprising:
    an array of light-field pixels, each light-field pixel comprising
       an aperture layer having an outer surface, first and second non-conventional apertures, and first and second conventional apertures, wherein the non-conventional apertures have higher gradients of transmission at normal incidence than the gradient of transmission of the conventional apertures; and
       a light detector layer configured to measure a first intensity of light through the first non-conventional aperture, a second intensity of light through one of the first and second conventional apertures, a third intensity of light through a third non-conventional aperture, and a fourth intensity of light through the other one of the first and second conventional apertures; and
    a processor configured to detect a wavefront in a first orthogonal direction based on a first intensity normalized by the second intensity and in a second orthogonal direction based on the third intensity normalized by the fourth intensity.

11. The light-field pixel system of claim 10, the processor further configured to generate one or more wavefront images of an object inducing the wavefront based on the detected wavefront.

12. The light-field pixel system of claim 10, further comprising a display for displaying one or more images based on the detected wavefront.

13. The light-field pixel system of claim 10, further comprising a computer readable medium.

14. The light-field pixel system of claim 10, wherein the light detector layer includes the processor.

15. The light-field pixel system of claim 10, wherein each aperture uniquely corresponds to a light detecting element in the light detecting layer.

16. The light-field pixel system of claim 10,
    wherein the first non-conventional aperture has a first longitudinal axis oriented at a first angle through the aperture layer, and
    wherein the second non-conventional aperture has a second longitudinal axis oriented at a second angle through the aperture layer.

17. The light-field pixel system of claim 10,
    wherein the first non-conventional aperture has a first offset from center of a corresponding light detecting element in the light detector layer, and
    wherein the second non-conventional aperture has a second offset from center of a corresponding light detecting element in the light detector layer.

18. A light-field pixel comprising:
    an aperture layer having an outer surface, a first slanting aperture oriented at a first angle through the aperture layer, a second slanting aperture oriented at a second angle through the aperture layer, and first and second non-slanting apertures; and
    a light detector layer configured to detect a wavefront in a first direction based on a first intensity of light through the first slanting aperture normalized by a second intensity of light through one of the first and second non-slanting apertures, and detect the wavefront in a second direction based on a third intensity of light through the second slanting aperture normalized by a fourth intensity of light through another one of the first and second non-slanting aperture.

19. The light-field pixel of claim 18, wherein first angle and second angles lie in orthogonal planes normal to the outer surface.

20. The light-field pixel of claim 18, wherein the light detector layer includes a first, second, third, and fourth light detecting elements, the first light detecting element configured to receive illumination through the first slanting aperture, and the second light detecting element configured to receive illumination through one of the non-slanting apertures, the third light detecting element configured to receive illumination through the second slanting aperture, and a fourth light detecting element configured to receive illumination through another one of the non-slanting apertures.

21. The light-field pixel of claim 18, wherein the light detector layer comprises a dielectric stack layer and a photosensitive layer.

22. A light-field pixel comprising:
    an aperture layer having an outer surface, a first shifted aperture having a first offset, a second shifted aperture having a second offset, and first and second non-shifted apertures; and
    a light detector layer configured to detect a wavefront in a first direction based on a first intensity of light through the first shifted aperture normalized by a second intensity of light through one of the first and second non-shifted apertures, and detect the wavefront in a second direction based on a third intensity of light through the second shifted aperture normalized by a fourth intensity of light through another one of the first and second non-shifted apertures.

23. The light-field pixel of claim 22, wherein the first offset is in the y-direction in a plane at the outer surface, and wherein the second offset is in the x-direction in the plane at the outer surface.

24. The light-field pixel of claim 22, wherein the light detector layer includes a first, second, third, and fourth light detecting elements, the first light detecting element configured to receive illumination through the first shifted aperture, and the second light detecting element configured to receive illumination through one of the non-shifted apertures, the third light detecting element configured to receive illumination through the second shifted aperture, and a fourth light detecting element configured to receive illumination through another one of the non-shifted apertures.

25. The light-field pixel of claim 22, wherein the light detector layer comprises a dielectric stack layer and a photosensitive layer.

26. A method of detecting a wavefront at a light-field pixel having an aperture layer and a light detector layer, the aperture layer having a non-conventional aperture and conventional aperture, the method comprising:
    receiving a wavefront at the aperture layer;
    measuring, at the light detector layer, a first intensity of light through a non-conventional aperture and a second intensity of light though a conventional aperture, wherein the non-conventional aperture has a higher gradient of transmission at normal incidence than the approximately zero gradient of transmission of the conventional aperture;
    normalizing the first intensity of light by the second intensity of light;
    mapping with the processor the normalized intensity to an incident angle using a calibration curve; and
    detecting the wavefront by determining a phase gradient based on the incident angle.

* * * * *